G. CROMPTON.
LOOM.

No. 177,323. Patented May 16, 1876.

Witnesses.
L. H. Latimer.
W. J. Pratt.

Inventor.
George Crompton
per Crosby Gregory Attys.

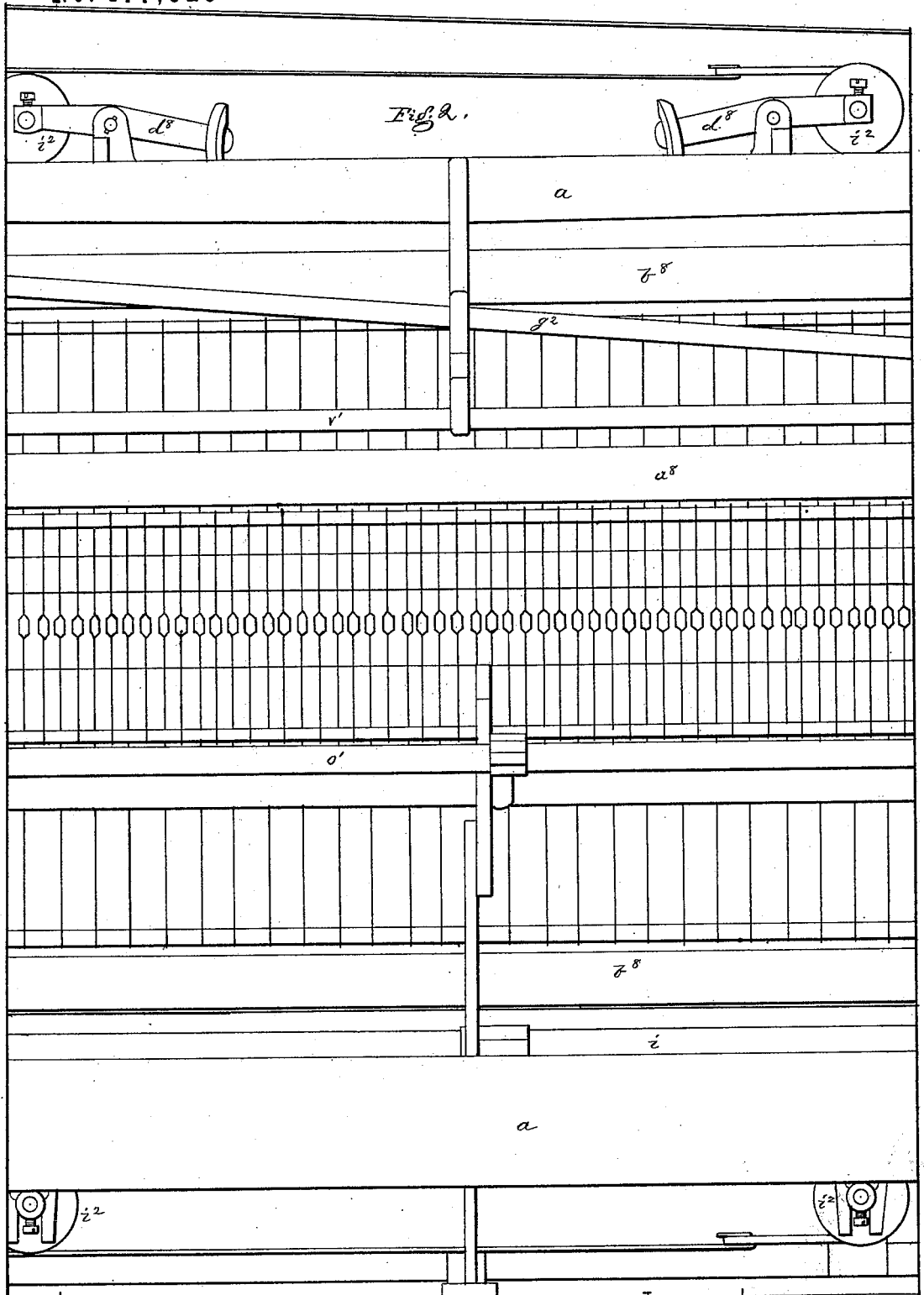

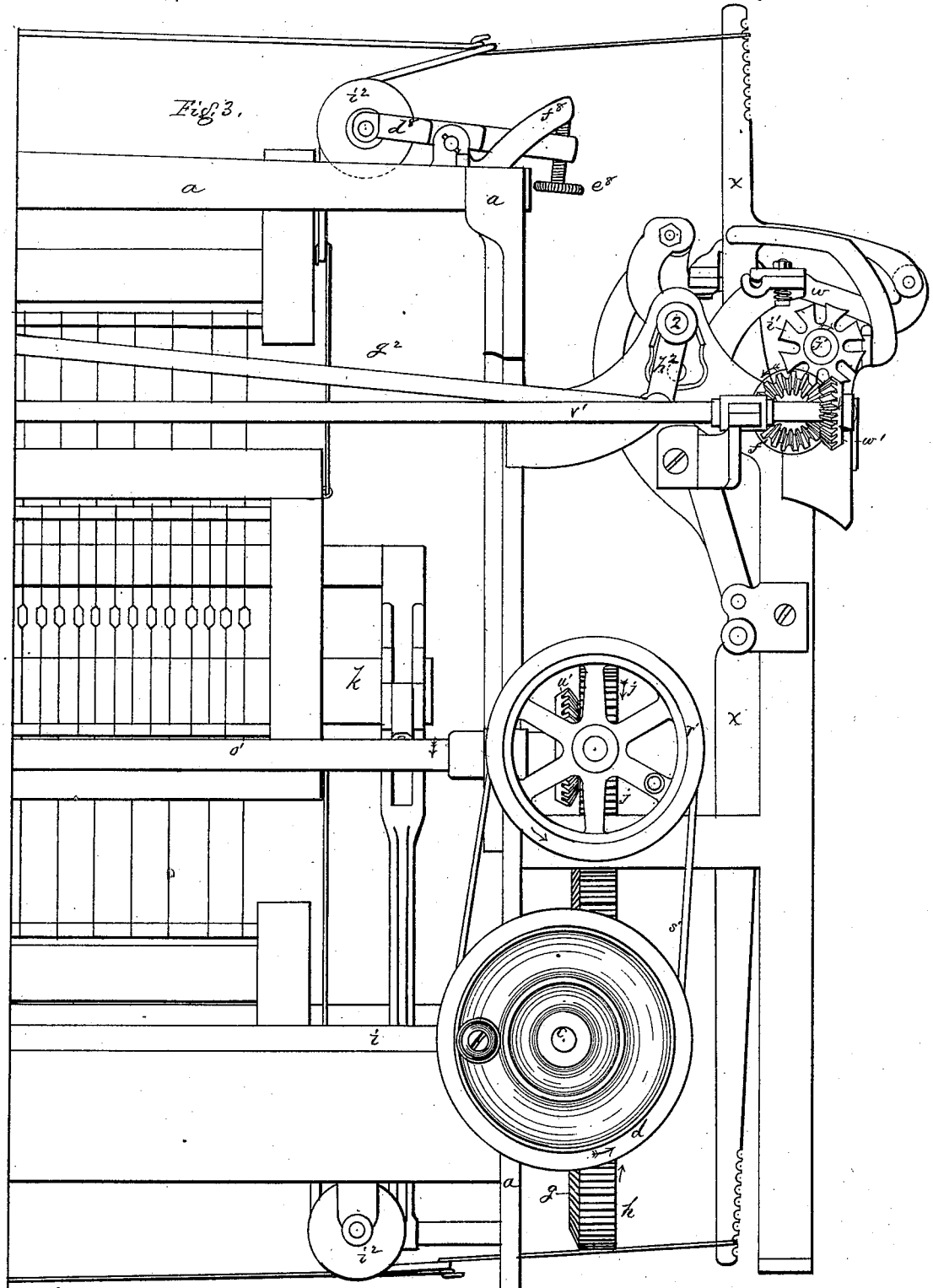

G. CROMPTON.
LOOM.

No. 177,323. Patented May 16, 1876.

Witnesses.
L. H. Latimer.
W. J. Pratt.

Inventor.
George Crompton
per Crosby & Gregory
Attys.

G. CROMPTON.
LOOM.
No. 177,323.
24 Sheets—Sheet 5.
Patented May 16, 1876.
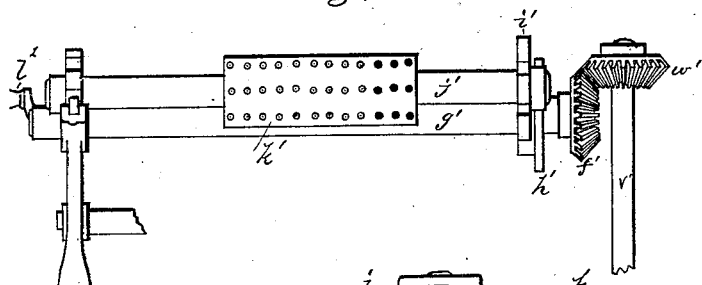
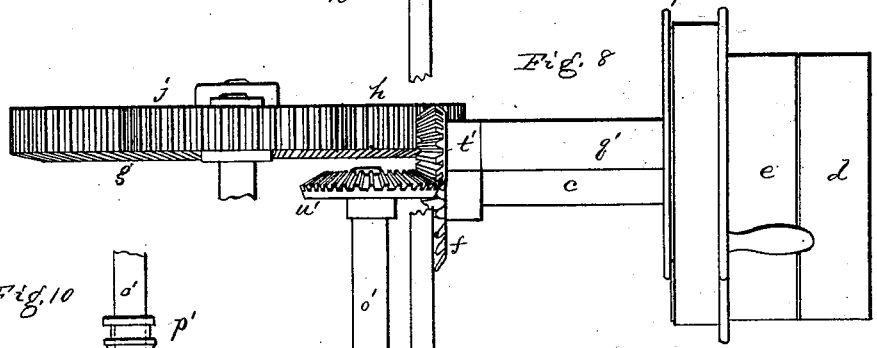
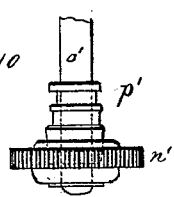
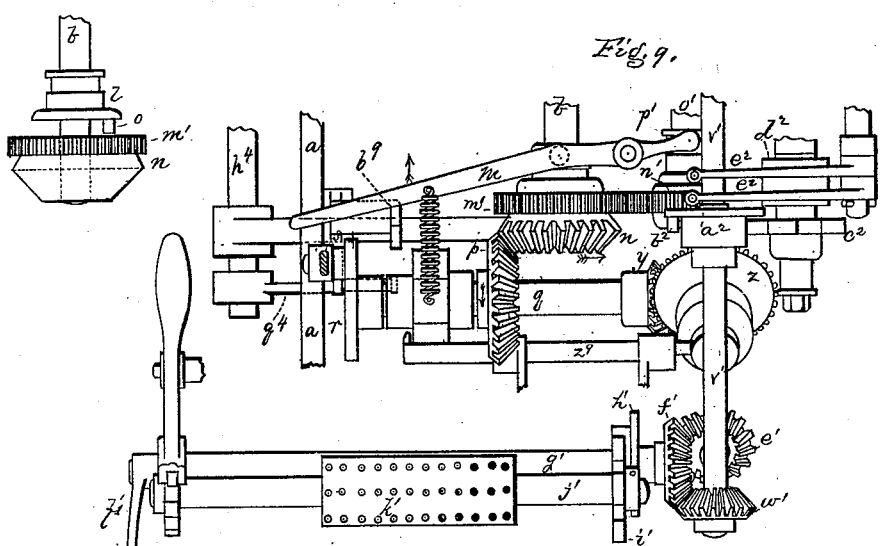

G. CROMPTON.
LOOM.

No. 177,323. Patented May 16, 1876.

Witnesses_
L. H. Latimer.
W. J. Pratt.
Scale 1/8 full size

Inventor_
George Crompton
per Crosby & Gregory Attys

24 Sheets—Sheet 11.
G. CROMPTON.
LOOM.
No. 177,323. Patented May 16, 1876.
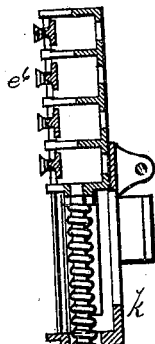
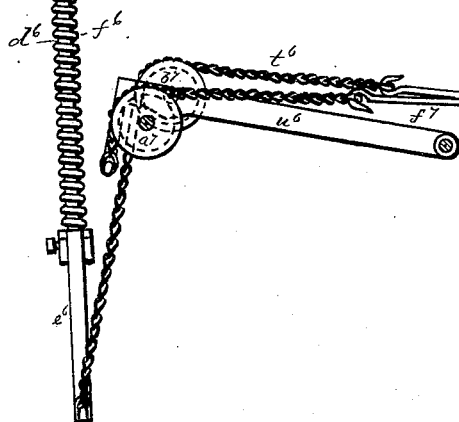
Fig. 17.
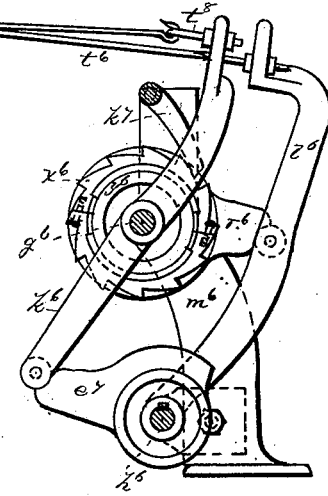
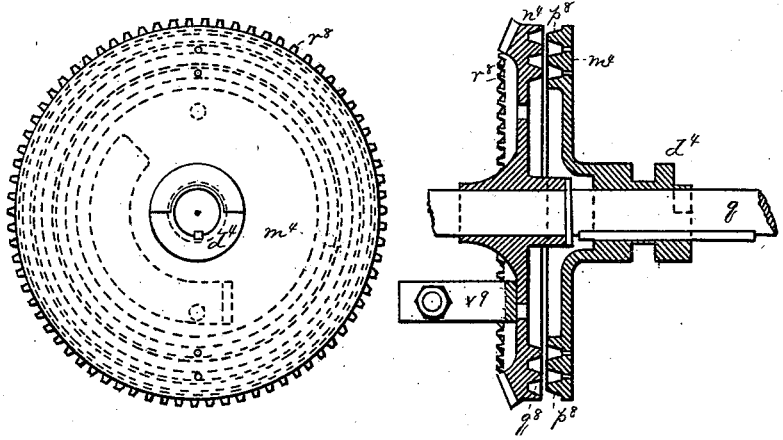
Fig. 49.  Fig. 50.
Witnesses  Inventor
L. H. Latimer.  George Crompton
W. J. Pratt.  per Crosby & Gregory, Attys
Scale 3"=1ft G. CROMPTON.
LOOM.
No. 177,323.
24 Sheets—Sheet 12.
Patented May 16, 1876.
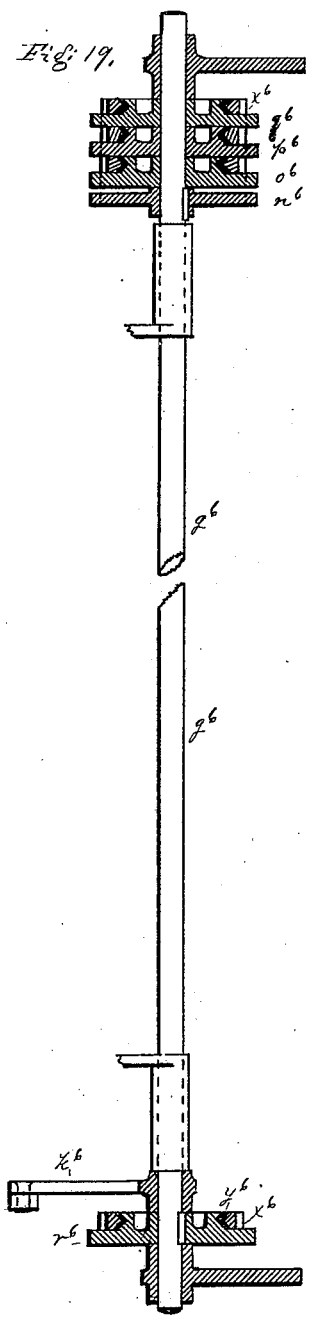
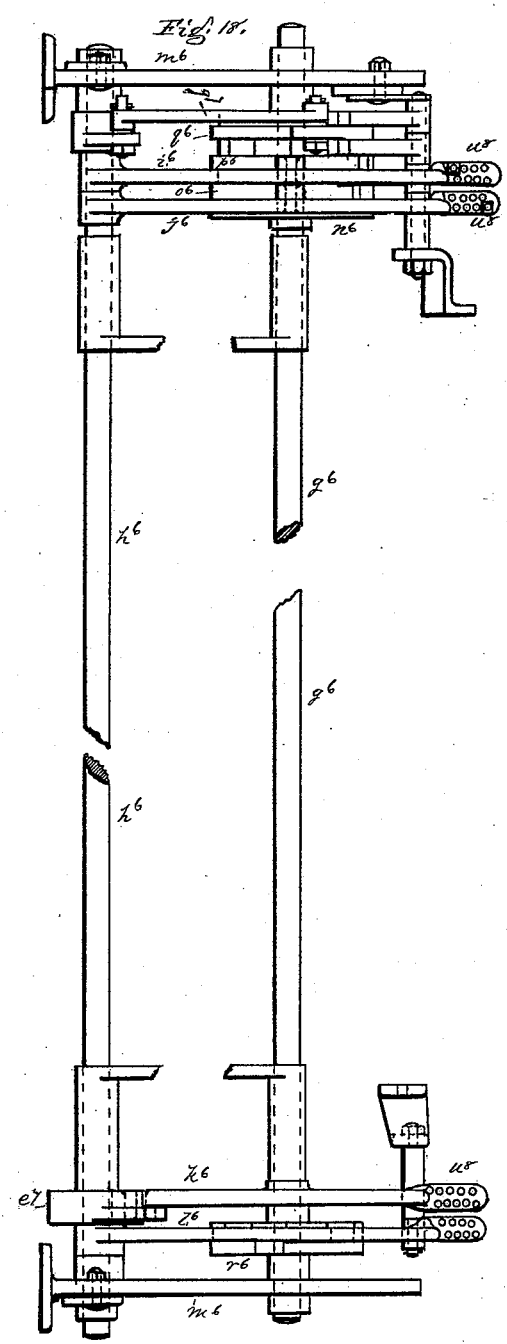

24 Sheets—Sheet 13.
G. CROMPTON.
LOOM.
No. 177,323. Patented May 16, 1876.
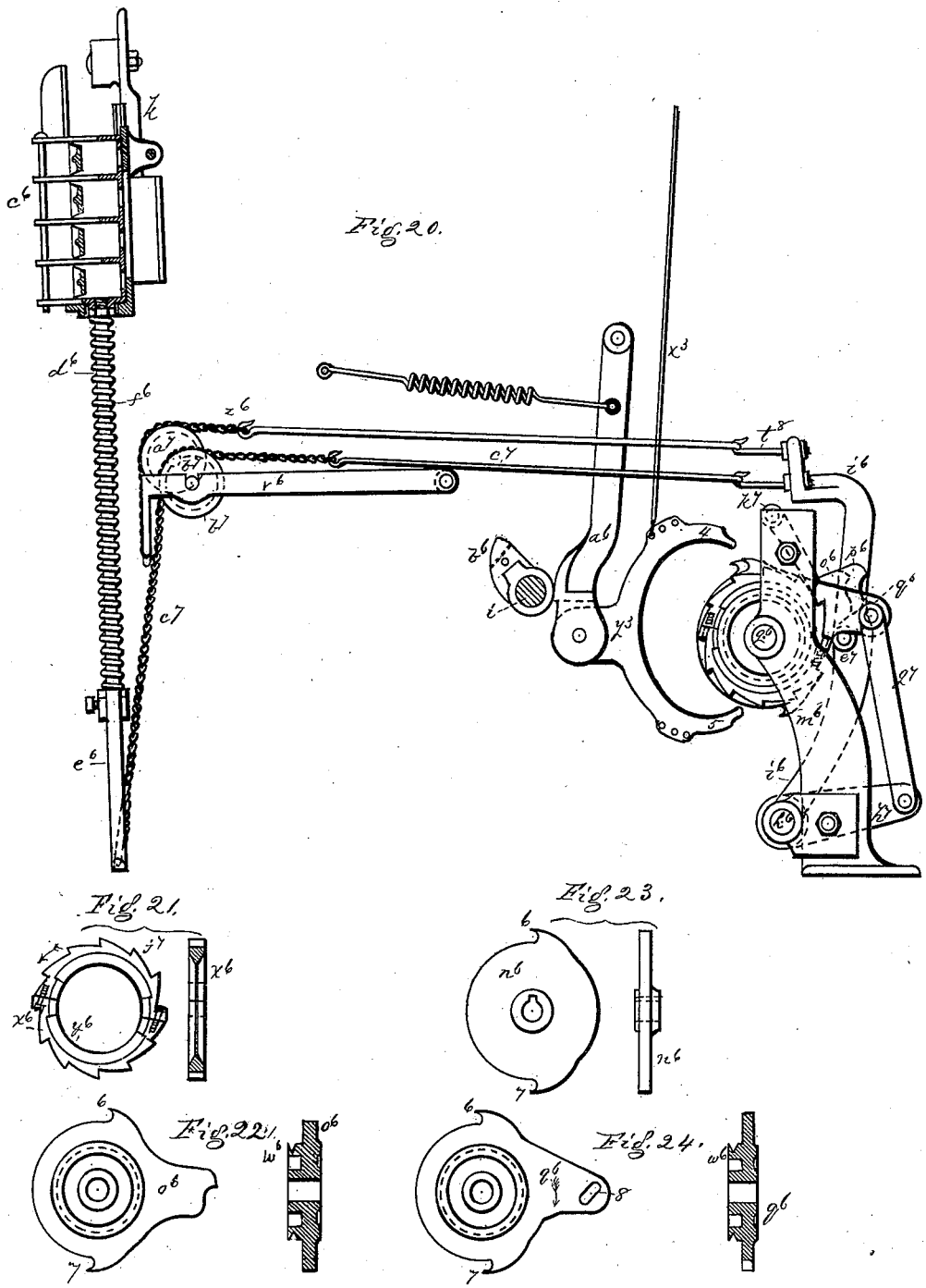

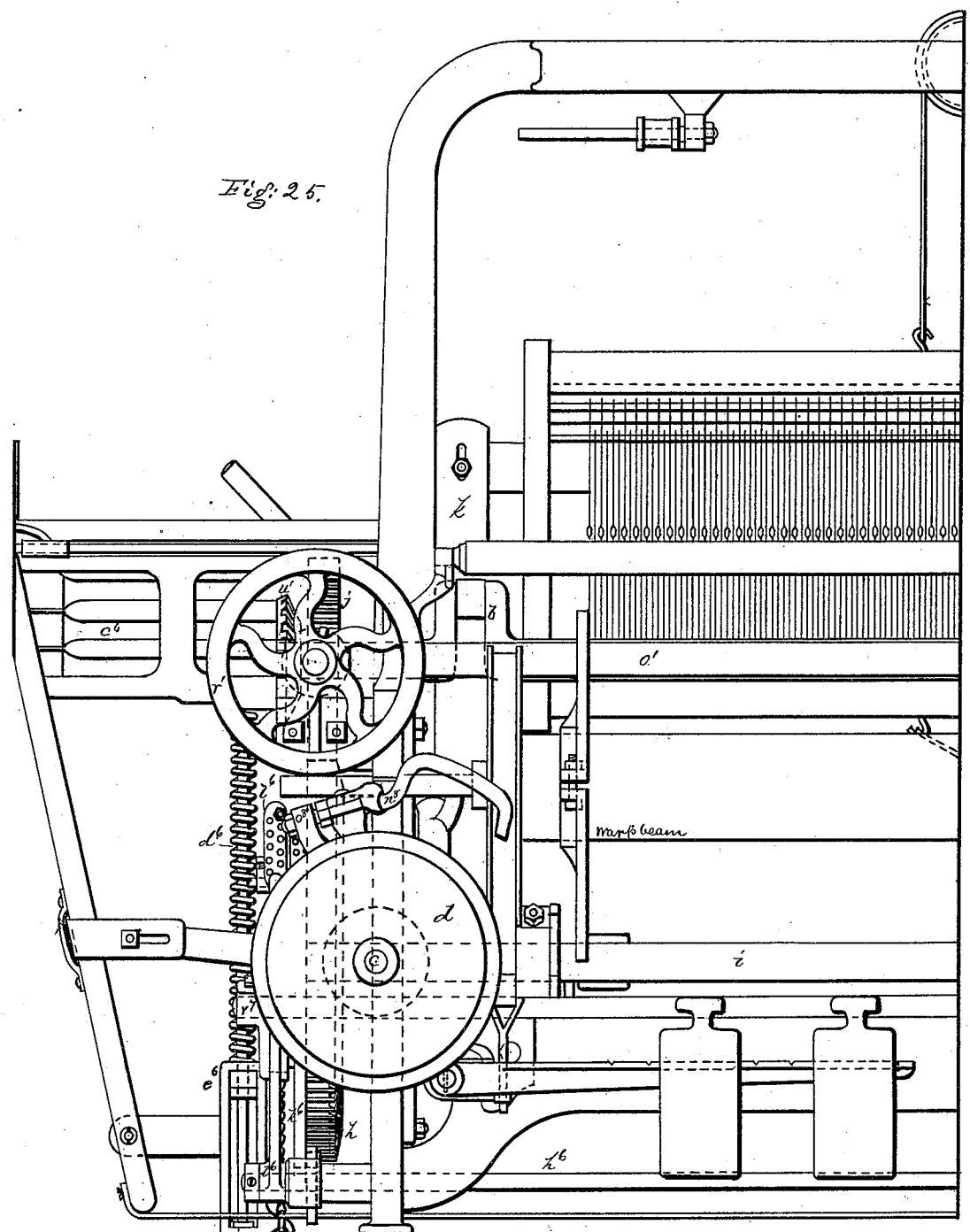

G. CROMPTON.
LOOM.

Patented May 16, 1876.

Witnesses.
L. H. Latimer.
W. J. Pratt.
Scale 2"=1ft

Inventor.
George Crompton
per Crosby & Gregory Attys

G. CROMPTON.
LOOM.

No. 177,323. Patented May 16, 1876.

Witnesses.
L. H. Latimer,
W. J. Pratt.

Inventor—
George Crompton
per Crosby & Gregory Attys.

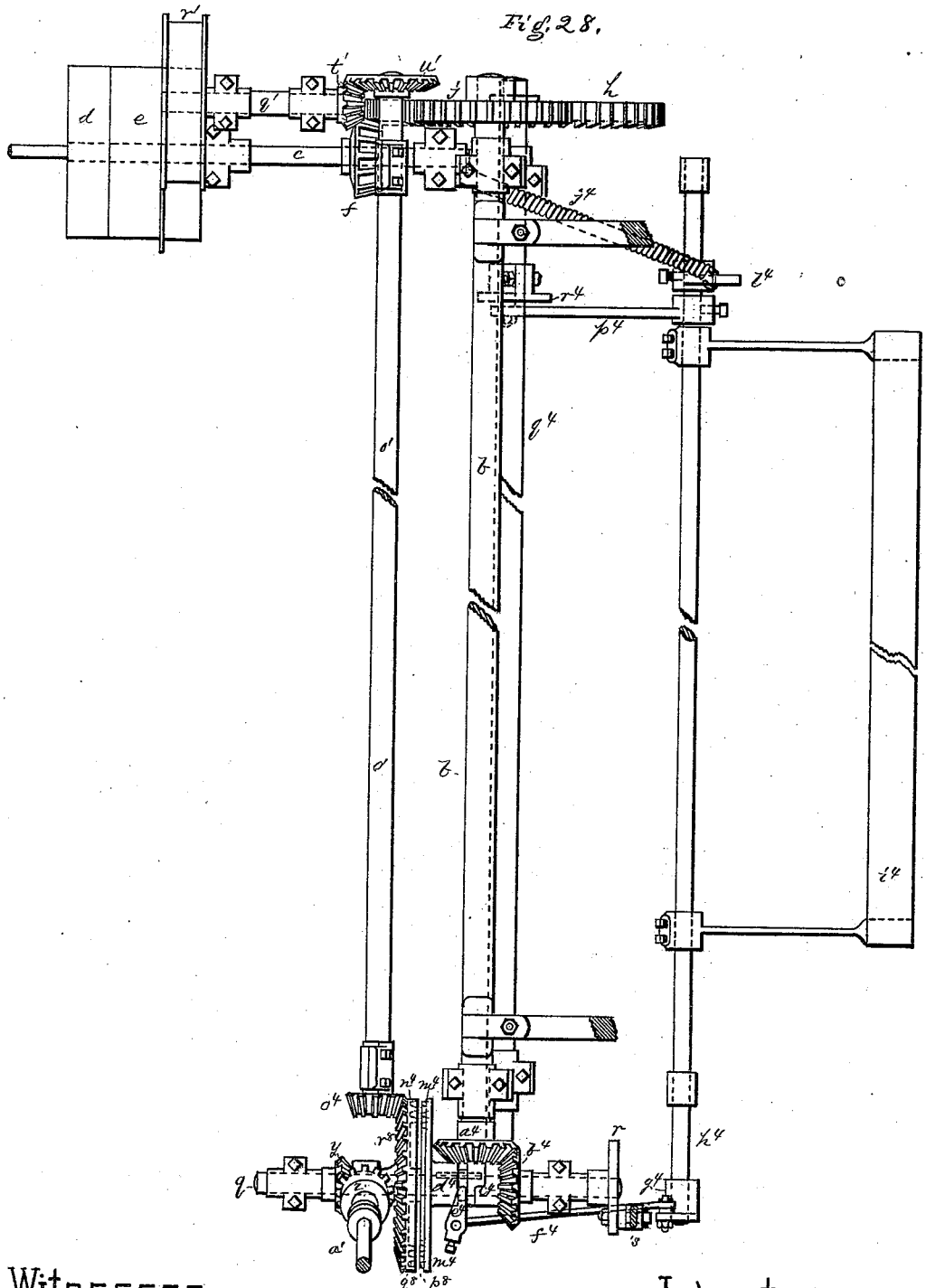

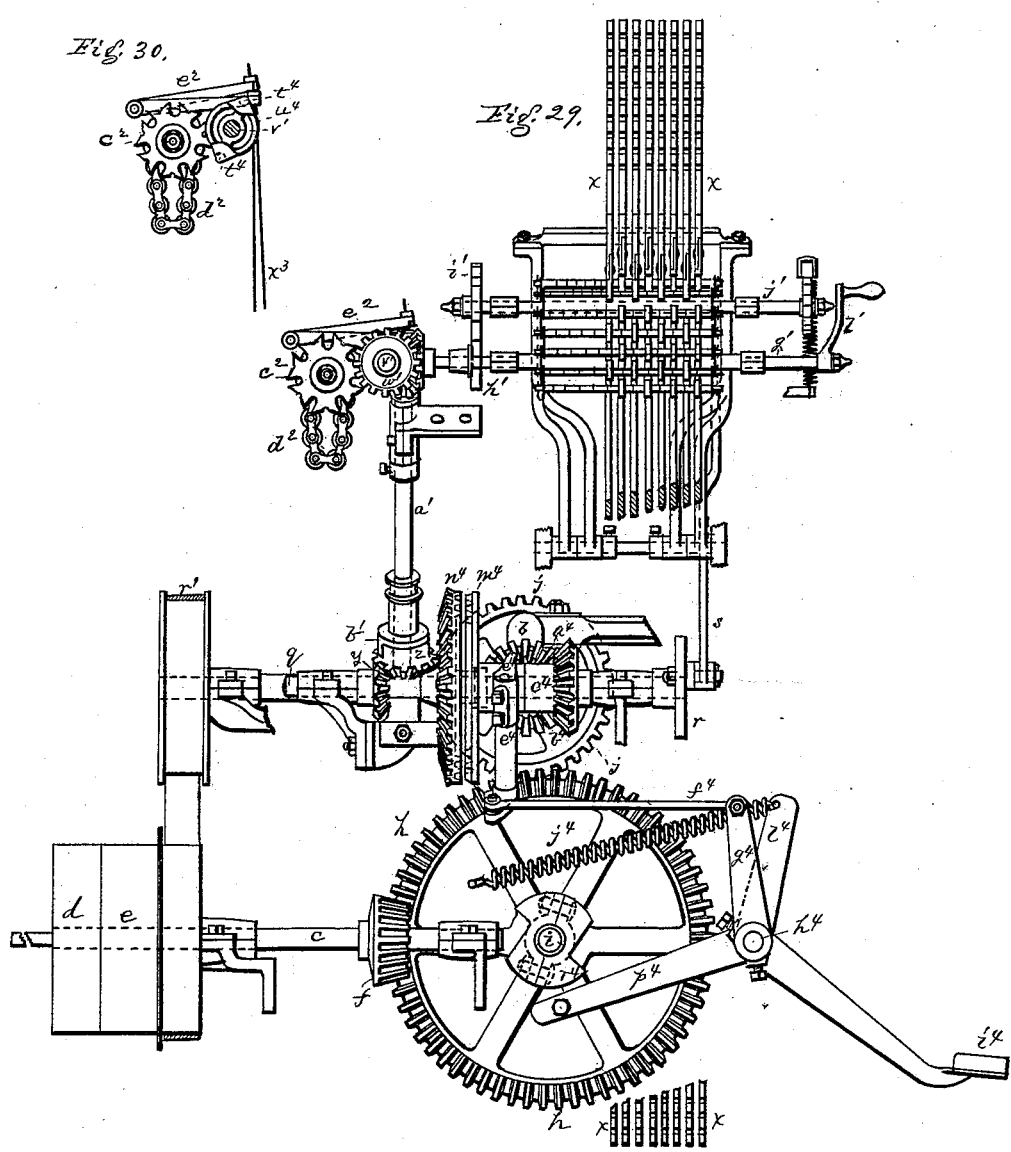

G. CROMPTON.
LOOM.

No. 177,323. Patented May 16, 1876.

24 Sheets—Sheet 20.
G. CROMPTON.
LOOM.
No. 177,323. Patented May 16, 1876.
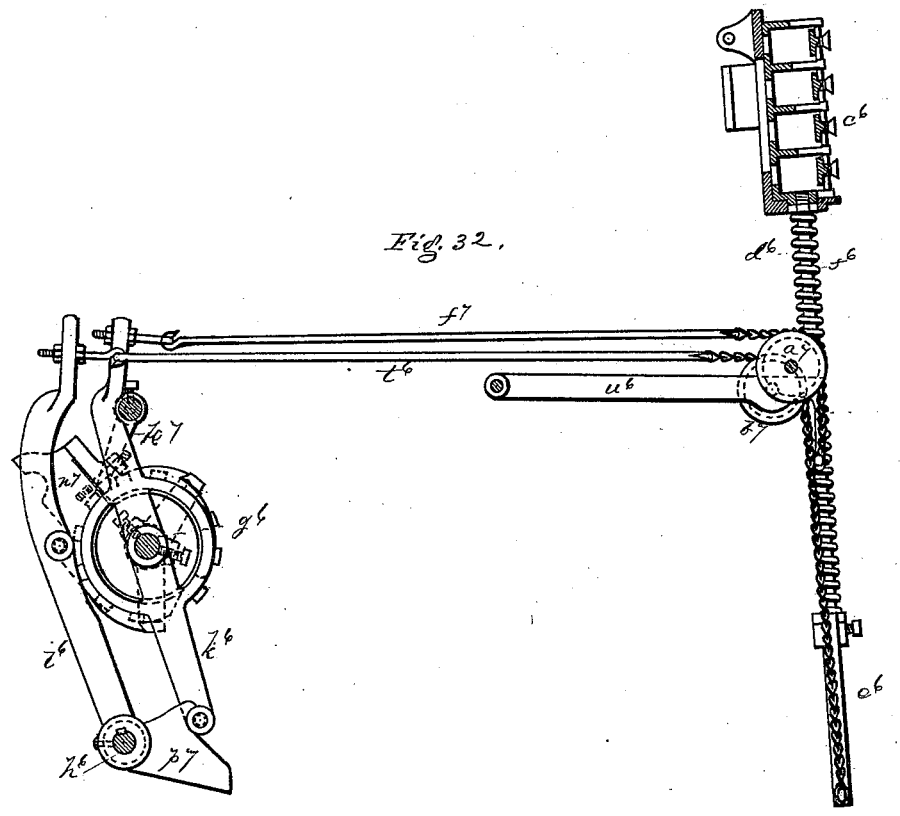
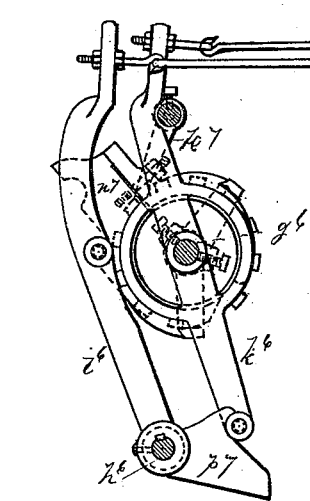
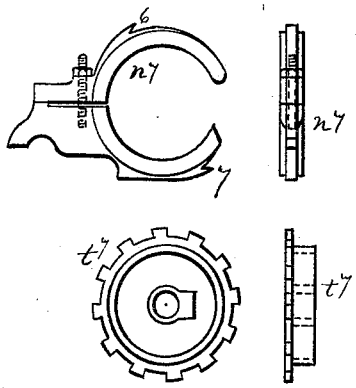
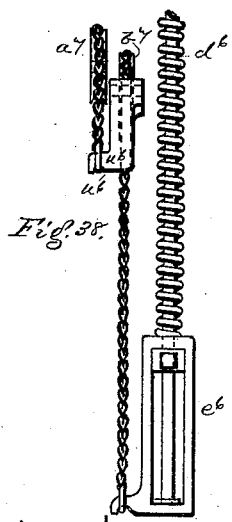
Witnesses—
L. H. Latimer
W. J. Pratt
Scale 2"=1/4"
Inventor—
George Crompton
per Crosby & Gregory Attys G. CROMPTON.
LOOM.
No. 177,323.
24 Sheets—Sheet 21.
Patented May 16, 1876.
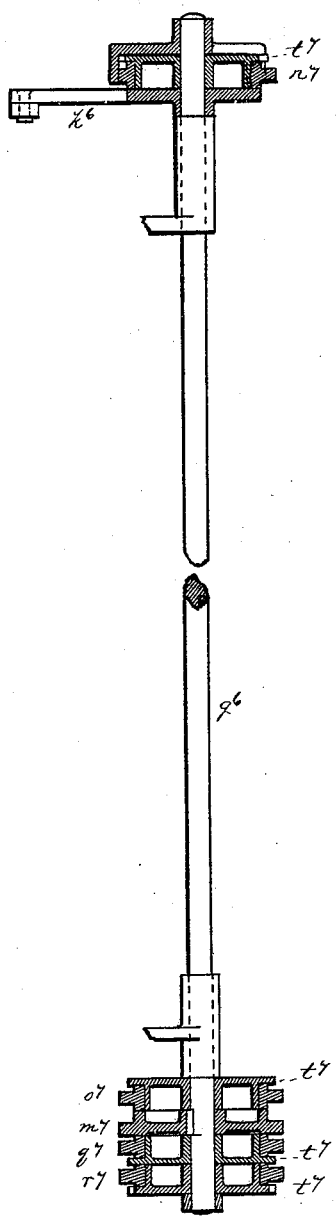
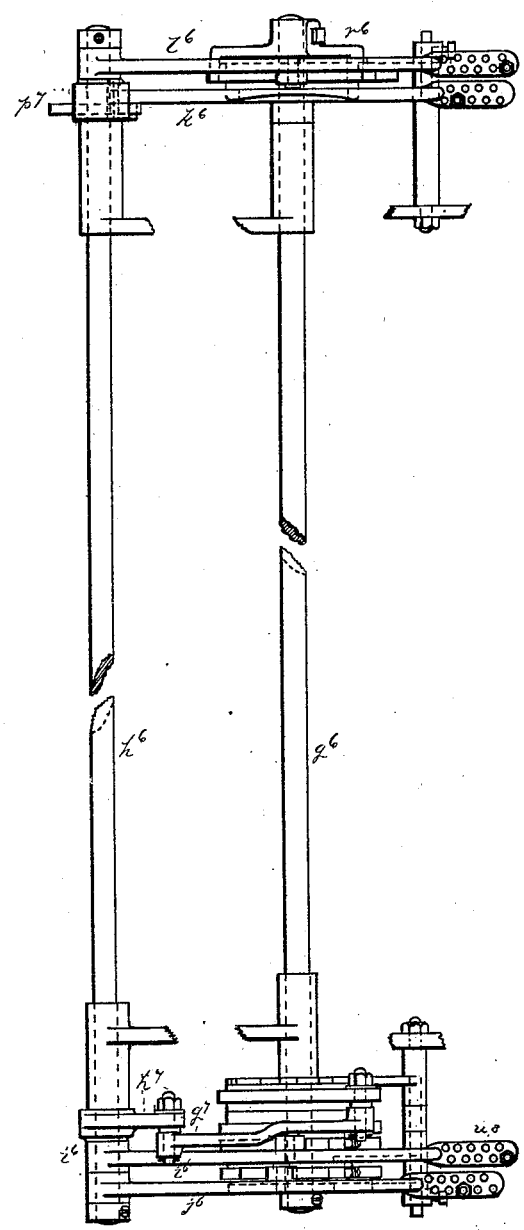
Witnesses—
L. H. Latimer
W. G. Pratt
Scale 2"=1'-0"
Inventor—
George Crompton
per Crosby & Gregory Atty G. CROMPTON.
LOOM.
No. 177,323.
24 Sheets—Sheet 22.
Patented May 16, 1876.
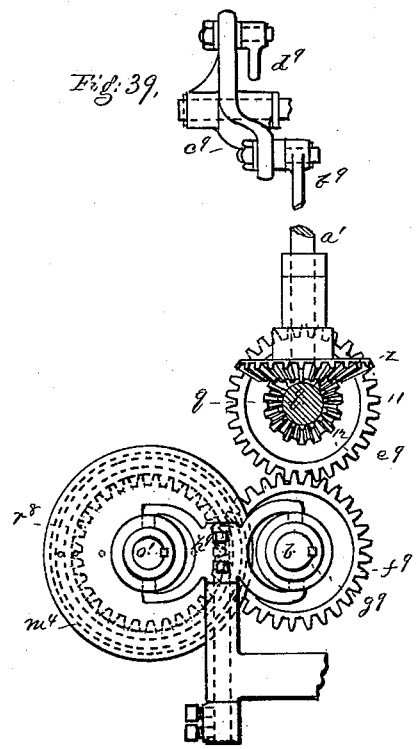
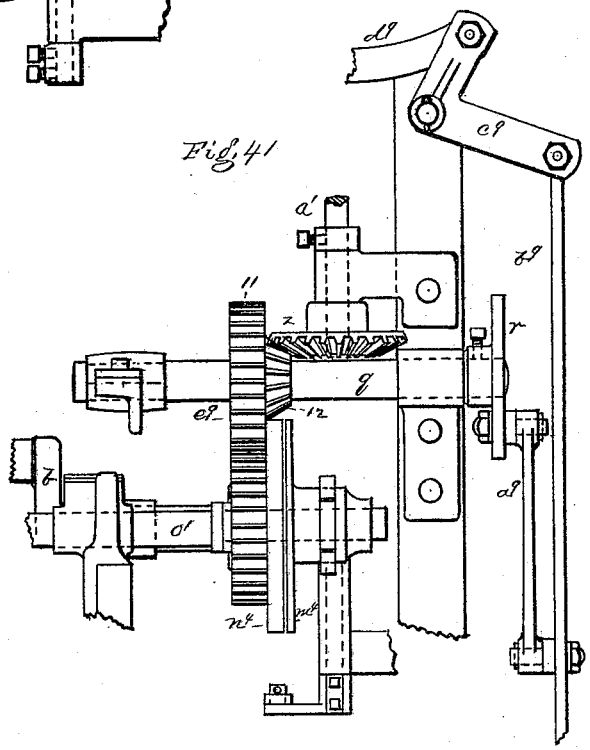
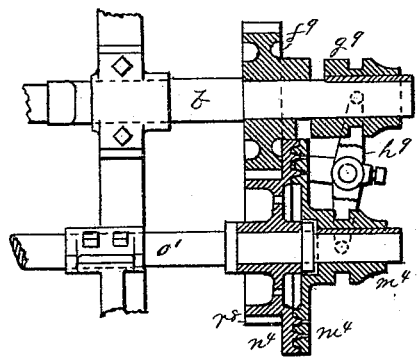
Witnesses—
L. H. Latimer
W. J. Pratt
Inventor—
George Crompton
per Crosby Gregory Attys 24 Sheets—Sheet 23.

G. CROMPTON.
LOOM.

No. 177,323. Patented May 16, 1876.

Witnesses—
L. H. Latimer.
W. J. Pratt.

Inventor—
George Crompton
per Crosby & Gregory Attys

24 Sheets—Sheet 24.
G. CROMPTON.
LOOM.
No. 177,323.　　　　　　　　Patented May 16, 1876.
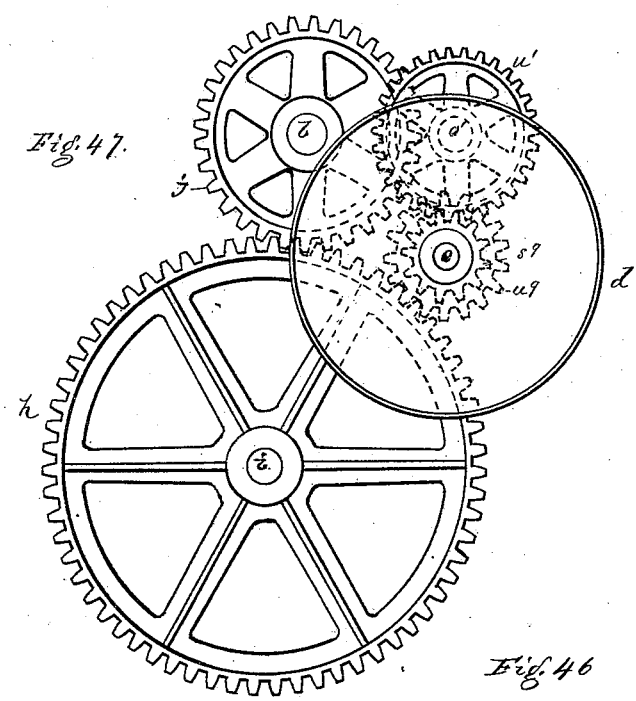
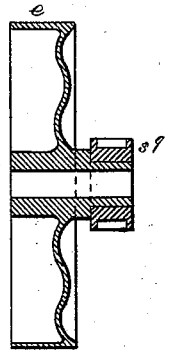
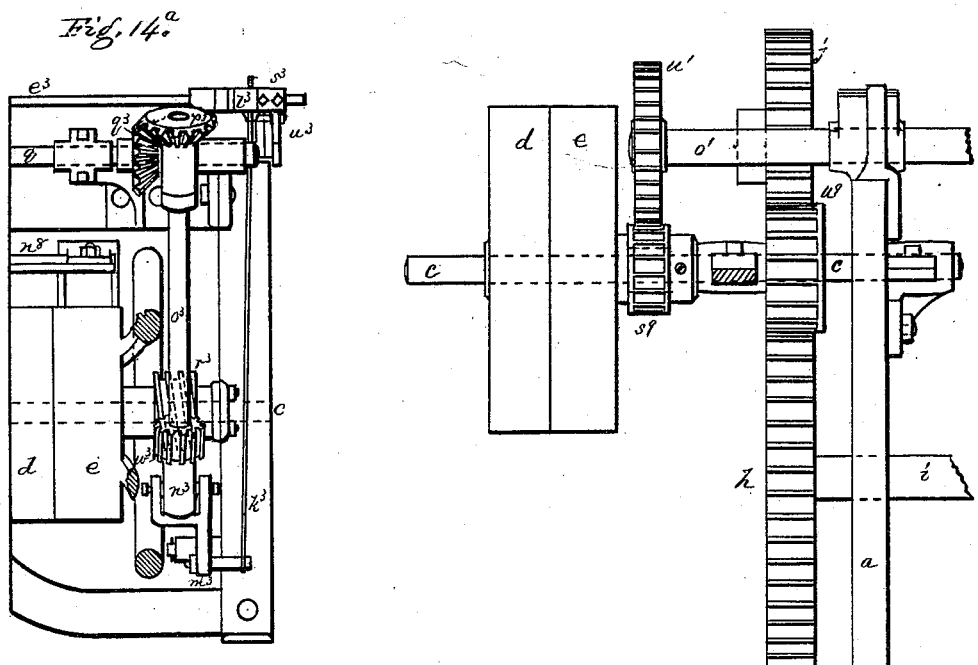
Witnesses—
L. H. Latimer
W. J. Pratt
Inventor—
George Crompton
per Crosby & Gregory Attys ized shafts; and the "Crompton looms" are # UNITED STATES PATENT OFFICE.

GEORGE CROMPTON, OF WORCESTER, MASSACHUSETTS.

IMPROVEMENT IN LOOMS.

Specification forming part of Letters Patent No. 177,323, dated May 16, 1876; application filed February 7, 1876.

*To all whom it may concern:*

Be it known that I, GEORGE CROMPTON, of Worcester, in the county of Worcester and State of Massachusetts, have invented Improvements in Looms, of which the following is a specification:

This invention relates to improvements in fancy-looms, and has for its object to enable a weaver to find a true shed after a broken or improper pick.

In fancy-looms, or looms for weaving figured fabrics, when a weft-thread is broken or fails to be properly laid, it is necessary, to preserve the pattern, that the weft, when mended or newly supplied, be laid in the true shed, or that shed where the weft failed to be perfectly laid, and therefore the true shed must be found, and this is accomplished by reversing the action of the loom and turning the pattern mechanism backward until the true shed is reached.

If drop shuttle boxes are used it is also necessary to turn back the pattern-surface for the shuttle-boxes to a position to correspond with the reversed or changed position of the harness pattern-surface when moved to find a true shed.

Looms have been constructed in which the crank-shaft has been provided with a clutch, so that the crank-shaft could be unclutched from the belt-pulley and be allowed to remain at rest, while the pulley, adapted to be connected with the other parts of the loom, as the shuttle-box mechanism and pattern-surface of the harness mechanism, could be reversed.

Such a mechanism is represented in United States Patent No. 163,799. In such patent the crank-shaft is provided with a fast and loose pulley, with two beveled pinions, loose on the shaft, and meshing with a bevel-wheel on the upper end of a vertical shaft, and two sliding clutch parts on the crank-shaft are adapted to be connected with the loose beveled pinions. Such patent describes that the shuttle-box and shedding mechanisms may be operated from either a vertical shaft provided with a bevel-wheel engaged by the loose bevel-wheels on the crank-shaft, or they may be operated from a pinion attached to one of the loose bevel-wheels; but such patent does not show devices for shedding the warps or moving the shuttle-boxes or pattern-surfaces.

This present invention is an improvement on such patent, and shows how the fancy-looms known as "Crompton looms" are changed to apply to them the invention described in the said Patent No. 163,799; and this invention shows mechanism for connecting and actuating in unison the shedding mechanism and pattern-surface, and also the pattern-surface of the shuttle-box mechanism.

The invention consists in mechanism whereby the shedding-shaft, that directly imparts motion to the lifter and depressor of the shed-forming mechanism, or to such mechanism and the pattern-surface of the shedding mechanism, and also to the pattern-surface of the shuttle-box mechanism, may be moved independently of the crank-shaft through a finder-shaft, that is thrown into or out of action as it is desired to cause it to operate the shedding-shaft, the connection between the crank and shedding shafts being through a suitable clutch, whereby the shedding-shaft, during the time the crank-shaft is at rest, and while the true shed is being reached, will be operated by the finder-shaft, the shedding mechanism running forward or backward.

The shedding-shaft is provided with a pinion, adapted to be engaged and operated by a pinion on the crank-shaft, the latter pinion, during the regular movement of the crank-shaft—the finder-shaft being disconnected—operating the shedding-shaft; but when the regular driving-belt of the loom is shifted to the loose pulley, or prevented from operating the crank-shaft, then one of the pinions connecting the crank-shaft and shedding-shaft is disconnected from a clutching part or hub, and made loose, this enabling the shedding-shaft, when positively moved from the finder-shaft, to operate without operating the crank-shaft.

The finder-shaft may be operated by power or by hand, and in either direction, and may be connected with the first-motion shaft, or with an independent shaft suitably operated.

This loom is to be provided with drop-shuttle-box mechanism, the construction of which may be of any usual form; but the construction preferred is shown in the accompanying drawings, and when the operation of the crank-shaft is suspended the picking mechanism and the shuttle-box-changing devices are thrown out of action.

In this loom the shuttle-box-operating devices and picking mechanism are operated through cams or tappets on a shaft, in connection with the crank shaft, and extending across the lower part of the loom, and suspending the action of the crank-shaft stops the action of the parts.

On the drawings, Figures 1, 2 and 3 represent portions of the rear side of the loom, the three sheets containing the figures together showing such rear side entire. Fig. 4 represents a detail of the shedding mechanism, the view being partially in section, and taken from the front of the loom at the left, a pattern-chain being added. Fig. 5 is a vertical section taken across the harness-frames or heddle-bars, the latter, in this instance, being arranged as in Patent No. 162,904. Fig. 6 represents sheaves, over which the cords or connections of the harness-frames or heddle-bars pass. Fig. 7 represents the pattern-cylinder at the right-hand end of Fig. 3; Figs. 8 and 9, details of devices by which the crank, finder, and shedding shafts and pattern mechanism are actuated. Figs. 10 and 11 represent the disconnecting-pinions of the finder and crank shafts, to be hereafter described, Figs. 7 to 11 being top views. Figs. 12 to 24, inclusive, represent modifications of the invention described and shown on Sheets 1 to 5, inclusive—Figs. 12 and 13, Sheets 6 and 7, together showing the back of the loom. Figs. 14 and 14$^a$ show an end view; Fig. 15, a view of the devices, in part, for disconnecting the crank-shaft preparatory to finding the true shed; Fig. 16, a partial vertical section, showing details of the connection between the crank and shedding shafts, and Figs. 17 to 24 represent details of a drop-shuttle-box-operating mechanism. Figs. 25, 26, and 27, Sheets 14, 15, and 16, together represent the back of a loom provided with a modified form of devices for disconnecting the shedding and crank shafts, and operating the former independently. Fig. 28 represents details of the devices to disconnect the crank-shaft, top view; Fig. 29, an end view thereof, partially in section, and looking at the end of the loom, (see Fig. 27;) Fig. 30, a detail of mechanism for actuating the pattern-cylinder in Fig. 29; Figs. 31 to 38, inclusive, details of another form of shuttle-box mechanism. Fig. 39 is an end view of a modified form of pick-finding mechanism, as applied to a variety of Crompton looms having horizontally-reciprocating notched jacks and elevator and depressor; Fig. 40, a partial section, and Fig. 41 a side view thereof; Figs. 42 to 45, another modification; and Figs. 46 to 48, yet another modification. Figs. 49 and 50 represent face and end views of the frictional clutch. These figures show only part of the pick-finding devices, and parts not shown are common to other figures already described; and Fig. 51, a detail of treadle to disconnect the crank-shaft, as shown in Figs. 1, 2, 3, and 9.

The loom-frame $a$ is of any suitable or well-known construction to support the working parts, and in suitable bearings thereon is the crank-shaft $b$, operated, as shown in Sheets 1 to 5, inclusive, by a shaft, $c$, called "first-motion shaft", and provided with a fast pulley, $d$, and loose pulley $e$, a bevel-pinion, $f$, on shaft $c$, engaging face-teeth $g$ of a toothed wheel, $h$, mounted on a shaft, $i$, provided with shuttle-picking and other working cams, and the wheel $h$ engages a toothed wheel, $j$, on the crank-shaft. The crank-shaft is connected by links with the lay $k$, as usual, and the lay is to be provided with shifting shuttle-boxes in any well-known way, or as hereafter described. On the crank-shaft is a crank-shaft pinion, adapted to be engaged by a hub, $l$, connected with the crank-shaft by means of a feather, but free to be moved longitudinally thereon by means of a shipper, $m$, said pinion having a toothed surface, $n$, and being mounted loosely on the crank-shaft, but adapted to rotate therewith when connected with the part $l$, the connection in Fig. 11 being by the pin $o$, that enters a hole in the toothed surface $n$.

When this pinion is connected so as to move with the crank-shaft, as shown in Fig. 9, the latter is operated by the pulley $d$ in the direction of the arrow marked near it, and the toothed surface $n$ engages a bevel-pinion, $p$, on the shedding-shaft, which consists of a shaft, $q$, provided, as shown in Fig. 9, with a crank, $r$, and with a pinion, $y$, the former being connected, by link $s$, with (see Figs. 1 and 4) an arm, $t$, or equivalent, of a rock-shaft, 1, connected with and adapted to operate a lifter and depressor, $u$ $v$, that engage notched jacks $w$, connected with upright levers $x$, notched at bottom and top for attachment and adjustment of the harness-cording, all as represented in Patent No. 140,894, granted to me, and the latter—the pinion $y$—operates, through connections substantially as described, the pattern surface or surfaces. This pinion $y$, on the shed-operating shaft $q$, engages pinion $z$, connected with the shaft $a^1$, that operates the pattern-surface of the shedding devices, the connection (see Fig. 1) being by means of a clutch, $b^1$, composed of the projecting portion of the hub of pinion $z$, loose on the shaft, and the hub $c^1$, connected with but free to slide on shaft $a^1$, a pin or finger projecting from a rock-shaft, $z^9$, Fig. 9, adapted to be moved by hand from the front of the loom, entering the groove $d^1$, so that the hub $c^1$ may be moved out of engagement with the hub of the pinion $z$ whenever it is desired to stop the motion of shaft $a^1$, to reverse the shedding devices and its pattern by hand through a handle on cross-shaft $g^1$. (See Figs. 9, 14, 29.) The upper end of shaft $a^1$ carries a pinion, $e^1$, that engages a pinion, $f^1$, on the end of this cross-shaft $g^1$, provided with a disk, $h^1$, and projecting pins or teeth, to engage the star-wheel $i^1$ on the shaft $j^1$ of the pattern-cylinder $k^1$, or the shaft that carries a pattern-chain, as in Fig. 4, Sheet 4, the pins on the disk, when the loom runs regularly, moving the pattern-surface at each rotation of the crank-shaft. The shaft $g^1$ has a handle, $l^1$, by which the pattern mechanism can be turned in either direction when the clutch $b^1$ is separated, these parts being all substantially as shown in United States Patent No. 156,630. By means of this cross-shaft and its handle, if the clutch $b^1$ is connected, and the crank-shaft pinion disconnected from the crank-shaft, it is possible to reverse the pattern and shedding mechanisms by hand; but in this invention the independent movement of the shedding mechanism and pattern-surfaces is not intended to be given in this way, but, on the contrary, the crank-shaft pinion has its toothed surface $n$ provided with teeth $m^1$, adapted to engage teeth on pinion $n^1$ on the finder-shaft $o^1$, provided, in Figs. 1, 9, and 10, with a hub, $p^1$, connected, if desired, (see Fig. 9,) with shipper $m$, the hub being keyed to the shaft $o^1$, but free to be moved longitudinally thereon by the shipper, or equivalent, the end of the hub being made conical, or being provided with a pin to engage with the pinion $n^1$, when desired. The finder-shaft $o^1$ in Fig. 8 is operated by a shaft, $q^1$, provided with a pulley, $r^1$, operated by hand or through a belt, $s^1$, connected with the loose pulley $e$ immediately back of fast pulley $d$, the shaft $q^1$ having a pinion, $t^1$, engaging a pinion, $u^1$, on the finder-shaft $o^1$.

With the shipper $m$ in the position shown in Fig. 9, the crank-shaft pinion is connected with the crank-shaft, and the loom operates in the regular way, the finder-shaft being out of actuating engagement with the shedding-shaft.

If a pick is broken, or for any imperfection in the weaving it is desired to find a true shed, the shipper $m$ is moved in the direction of the arrow placed next to it, Fig. 9, disconnecting the crank-shaft from the shedding-shaft $q$, that operates the shedding mechanism, and at the same time the driving-belt of the machine is shifted from the fast to the loose pulley. As the crank-shaft is disengaged from the crank-shaft pinion, the pinion $n^1$, which, on Sheets 1 to 5, is a loose pinion, but which may be made to drive the shedding-shaft, is connected with the finder-shaft, (it being then in motion, provided it is belted or geared with the loose or a moving pulley not on the crank-shaft,) and movement of finder-shaft $o^1$ in the direction of its arrow, Fig. 1, will, through pinion $n^1$, then made fast to it, move the shedding-shaft, the connection (shown in Figs. 1 and 9) being through the toothed part $m^1$ of the crank-shaft pinion that engages pinion $p$, and reverses the movement of the shedding-shaft $q$ and the shedding mechanism and pattern-surface, such movement in the reverse direction continuing until the true shed is found.

The true shed may, however, be found by stopping the crank-shaft and operating the shedding mechanism and pattern-surface forward instead of backward, and to do this it is only necessary to move the finder-shaft $o^1$ in a direction the reverse of its arrow, which may be done by means of a cross-belt or by hand.

At the back of the loom (see Figs. 1, 3, and 9) is placed a pattern-connecting shaft, $v^1$, provided with pinions $w^1$ engaging the pinions $f^1$ on the cross-shafts $g^1$, and in this way the pattern-surfaces at opposite ends of the loom, in a loom provided with a double shedding mechanism, or with interior and exterior heddle-frames $a^8$ $b^8$, Fig. 5, may be operated in unison; and if it is desired to operate but one of the shedding mechanisms at but one end of the loom, then the shaft $v^1$ may be provided with a clutch, $x^1$, to disconnect the part of the shaft at the right of the clutch from the part at the left of the clutch; and if the shedding devices are all at one end of the loom, then the shaft $v^1$ need not extend beyond the shuttle-box pattern-surface, which it also operates, (see Figs. 1 and 9,) wherein pin $b^2$ on wheel $a^2$ (the wheel being provided with two pins, $b^2$, but one only being shown) engages the star-wheel $c^2$ on the shuttle-box pattern-surface $d^2$, of suitable or well-known construction, but shown in such figures as a rotating pin-cylinder, and the two pins operate the shuttle-box pattern-surface each time that the shedding pattern surface moves; but these pattern surfaces may be moved in other order, as the exigencies of the pattern may require.

The pins of this pattern-surface act on fingers $e^2$, suitably connected by wires or cords with the pawls or other selecting devices to move the shuttle-box lever or rod, and with the connection described the shuttle-box pattern-surface is turned with, and in unison with, the pattern-surface of the shedding mechanism.

At the end of the rock-shaft 1 (see Fig. 1) is an arm, $f^2$, that is connected by link $g^2$ with an arm, $h^2$, attached to a rock-shaft, 2, corresponding with the rock shaft 1 on the opposite end of the loom.

In the loom represented in Figs. 1, 2, and 3, the levers, jacks, pattern mechanism, and lifters, depressors, and eveners at each end of the loom are alike, and are adapted to operate the heddle frames or bars, to which heddles are attached, through connections extending from the levers to the frames or bars, the cords or connections passing over sheaves $i^2$, held preferably in adjustable frames or bearings, to permit the sheaves to be raised or lowered, as it is desired to place the heddle frames or bars in a higher or lower position, the connections between the heddle-frames or bars and jacks being made and being designed to operate as in Patents Nos. 162,904 or 140,894.

The sheaves $i^2$ (see Fig. 6) have at one edge a flange, $c^8$, the other edge being practically without a flange, and the sheaves are placed with reference to each other, so that each flanged side comes next an unflanged side; but one flange, therefore, separates each harness-frame-connecting cord, and enables the harness-frames to be placed closer together than would be the case had the sheaves two flanges.

These sheaves are mounted on a shaft at the end of a pivoted sheave-carrier, $d^8$, (see Fig. 3,) provided with an adjusting-screw, $e^8$, adapted to work against a brace or projection, $f^8$; or the sheave-carrying shaft (see Fig. 1) may be sustained in movable journals or brackets $h^8$, and the journals may be raised or lowered by set-screws $i^8$.

In broad looms it is very desirable to stop the loom instantly whenever a mispick is discovered, and without going to the end of the loom where is located the shipper $m$; to do this a foot-treadle, $i^4$, is used. The treadle (see Fig. 51, Sheet 7) is connected with a rock-shaft, $h^4$, (see also Figs. 1 and 9,) provided with an upright arm, $l^4$, held by a spring, $j^4$, so that the arm $p^4$, projecting backwardly from the rock-shaft, will be held away from the notched cams $r^4$; but by means of the pressure of the foot on the treadle $i^4$ the end $p^4$ may be raised whenever the notches in the cam-wheel $r^4$ permit it, and then an arm, $q^4$, through a link, $f^4$, connected with an arm, $a^9$, of an elbow-lever, causes its upper end $b^9$ to engage the shipper-handle $m$, Fig. 9, and disengage the parts $l\ m^1$ and stop the crank-shaft. This foot-treadle enables the operator to stop the loom quickly and easily, and leaves the operator both hands for handling the shuttle and threads.

On Sheets 1 to 5, inclusive, devices have been shown for disconnecting the shedding mechanism from the crank-shaft; but it will be evident to those skilled in the art that the details of this mechanism may be changed in form without departing from this invention. Figs. 12 to 16 show a modified form of loom embodying this invention.

In such loom, and in another modified form of loom, (shown in Figs. 25 to 29,) and hereafter described, the heddle-frames are of the usual kind, and not double, as shown in Figs. 1, 2, and 3, and the single heddle-frames are operated through the medium of levers, notched jacks, and lifter, depressor, and evener-bars, and pattern-surface, as shown in Figs. 1, 2, and 3, and in all the figures like parts of the shedding and pattern mechanisms are designated by like letters; therefore, in the description of these modified looms, the mechanism for moving the levers to lift the heddle-frames will not be described, they being of usual form.

Referring to Figs. 12 to 16, the first-motion shaft $c$ has a fast and loose pulley, and a pinion to engage side teeth on a wheel, $h$, of the cam-shaft, geared with a pinion on the crank-shaft $b$, substantially as shown in the loom first described, shaft $c$ operating the crank-shaft through these connections, when the loom is operating regularly.

On the end of the crank-shaft is a crank-shaft pinion, $a^3$, it being, in this instance, a bevel-wheel loose on the shaft, but provided with a shouldered hub, $b^3$, (see Figs. 15 and 16,) adapted to engage with a shouldered clutch-piece, $c^3$, arranged to turn with, but to slide on, the crank-shaft $b$, the clutch-piece $c^3$ being moved to allow the crank-shaft pinion to be loose upon or to be held fast upon the crank-shaft by means of a fork, $d^3$, engaging a groove in $c^3$. This fork is carried by a rod, $e^3$, supported in bearings 3, Fig. 15, and connected, through arm $f^3$ and rod $g^3$, with a shaft, $h^3$, rocked or turned, when it is desired to loosen pinion $a^3$, by means of a handle or shipper, $i^3$, or by means of a rod, $j^3$, extending from the handle or shaft to a treadle, $i^4$, placed, preferably, at the front of the loom, where the weaver stands. When the shipper (in this instance $i^3$) is depressed, the pinion $b^3$ is disengaged from the crank-shaft, a suitable spring at all other times keeping the pinion $b^3$ and clutch-piece $c^3$ in engagement. The movement of rod $e^3$ to disengage the pinion $b^3$ lifts arm $s^3$, connected therewith, and provided with an adjustable pin, $t^3$, and the latter lifts the arm $l^3$, mounted loosely on the rod $e^3$, and connected, by rod $k^3$, with an elbow-lever, $m^3$, carrying a pivoted step, $n^3$, in which the finder-shaft (in this instance lettered $o^3$) rests, and when the elbow-lever is moved in the direction of its arrows the worm-wheel $w^3$ on the finder-shaft is engaged with the worm $r^3$ on the hub of the loose pulley $e$, which, driven by the belt removed from the fast pulley by any usual shipping mechanism, moves the finder-shaft in this modification, mounted at its upper end in a rocking bearing, so that its bevel-wheel $p^3$, engaging with a bevel-wheel, $q^3$, moves the shedding-shaft $q$, provided with toothed wheels $p\ y$ and crank $r$, to operate the shedding mechanism and pattern surface or surfaces, as set forth in the drawings already described.

When the arm $l^3$ is lifted, (the extent of its motion being determined by the adjustable pin $t^3$, to cause the wheels $w^3\ r^3$ to fit properly,) its end, when elevated, is caught by the upper end of a notched catch, $w^3$, held in position by a spring, (see Fig. 12,) and the catch prevents the wheels $w^3\ r^3$ from moving apart; but when it is desired to cease operating the shedding-shaft from the finder-shaft, then the movement of the rod $e^3$ causes the finger or arm $s^3$ to strike the lower end of the catch $w^3$, which trips the catch and allows the gear $w^3$ to fall away from worm $r^3$.

The shaft $v^1$, for operating the shuttle-box pattern-surface, is provided with a plate or disk having two pins to engage and move the star-wheel $c^2$ of the pattern mechanism $d^2$, provided in Figs. 12 and 14 with a chain of usual construction, on the rollers or protuberances of which rest fingers $e^2$, connected by rods or cords $x^3$ with the indicating-pawls $y^3$ of the shuttle-box-moving devices.

Figs. 14, 14ª show one form of devices for shifting the driving-belt from the fast to the loose pulley. Such devices are fully shown and described in United States Patent No. 77,361. The usual shipper-lever $j^8$ is connected with an elbow-lever, $k^8$, on a stud, $l^8$, and a rod, $m^8$, attached to the elbow-lever, is adjustably connected with the fork part $n^8$ of the shipper, pivoted to a pivoted radius bar or link, $o^8$, the link $o^8$ obviating friction, which would result were the parts moved horizontally in bearings.

Referring to Figs. 25 to 29, inclusive, wherein is described another modification of a loom provided with devices for disconnecting the crank-shaft from the shedding-shaft, so that the latter may be driven by a finder-shaft. $c$, Fig. 28, represents the first-motion shaft, provided with a fast and loose pulley, $d\ e$, and with a bevel-pinion, $f$, to engage side teeth on a toothed wheel, $h$, supported on a shaft, and engaging with a toothed wheel, $j$, on the crank-shaft $b$, provided with a crank-shaft pinion, $a^4$, adapted to engage a toothed wheel, $b^4$, having a notched hub, $c^4$, mounted loosely, in this instance, on the shedding-shaft, provided, as before described, with a bevel-gear, $y$, to move the pattern-surfaces through a shaft, $a^1$, and with a crank, $r$, and link $s$, to operate the shedding mechanism, as already described. In this instance the crank-shaft pinion is fixed to the crank-shaft, and the pinion $b^4$ on the shedding-shaft (it corresponding in operation and function with the pinion $p$, represented in the looms before described) is made loose, instead of being positively secured to the shedding-shaft, as heretofore represented.

The notched hub $c^4$ of the loose pinion $b^4$ is adapted to engage with a clutch, $d^4$, adapted to rotate with, but to slide on, the shedding-shaft $q$, being actuated by a fork, $e^4$, connected by a link, $f^4$, with an arm, $g^4$, of a rock-shaft, $h^4$, under control of a foot-treadle, $i^4$, or it may be a hand-lever, the rock-shaft being held in position to keep $c^4 d^4$ locked during the regular motion of the loom by a spring, $j^4$, connected with an arm, $l^4$, and when in engagement the crank-shaft, through its pinion, operates the shedding-shaft.

The clutch $d^4$ has connected with it a friction-wheel, $m^4$, having its face provided with a series of annularly-projecting ridges, $p^8$, made preferably with beveled sides, to fit correspondingly-shaped grooves on the face of toothed disk $n^4$. The wheel $m^4$ is connected to the shedding-shaft in such manner that the wheel cannot be engaged and moved without also moving the shedding-shaft, and so far it is alike in function and operation with toothed wheel $p$ in Fig. 9; but, instead of being engaged by teeth on a pinion driven from the finder-shaft, it is operated through friction between its face or side and the side or face of a disk, $n^4$, having teeth $r^8$, the disk being arranged loosely on the shedding-shaft $q$, and engaged by a pinion, $o^4$, on the end of the finder-shaft, (in this instance lettered $o^1$,) and operated from a short shaft, $q^1$, connected preferably by belt with the loose pulley $e$, the shaft $q^1$ having a bevel-pinion, $t^1$, engaging a pinion, $u^1$, on the finder-shaft, all as described in Figs. 8 and 9.

During the regular operation of the loom the faces of $m^4\ n^4$ are out of contact; but when the crank-shaft is stopped and the driving-belt is shifted in the usual way, preferably by devices substantially as described in other patents granted to me, then the shipper $e^4$ is moved to disengage the parts $c^4 d^4$ and engage $m^4\ n^4$, and $n^4$, being operated by its connection with the loose pulley and finder-shaft, as before described, is turned to reverse the operation of the shedding mechanism and its pattern-surface, and with it the shuttle-box pattern-surface, the crank-shaft during this time remaining at rest, while the shedding-shaft turns freely in the hub of pinion $b^4$.

The rock-shaft $h^4$ is provided with an arm, $p^4$, that extends under a shaft, $i$, to which are attached the shuttle-picking cams and the cams $b^6$, (see Figs. 14 and 20,) for throwing forward the radius-bar $a^6$, to which are connected the pawls $y^3$ for selecting the shuttle-boxes, and cams $r^4$ on this shaft prevent the shipper $c^4$ from being moved by the foot-lever $i^4$, except when the depressed portions of the cams are over the end of the arm $p^4$, and in such position the pawls for moving the shuttle-box-operating cams are also at their extreme backward throw, and in this position the shuttle-box pattern-surface may be turned freely, and the parts may rise and fall without striking the shuttle-box cams. These cams $r^4$ also serve, in a measure, to prevent the accidental stopping of the loom if the treadle should be pressed down at the wrong time.

In Fig. 30 the shaft $v^1$—common to all the figures, and used to rotate the shuttle-box pattern mechanism $d^4$—is provided with a plate, $s^4$, with pins $t^4$, (shown in dotted lines,) the periphery of the plate being curved at $u^4$, to hold the star-wheel $e^2$ in position when moved by pins $t^4$.

Figs. 39 to 41 show this invention applied to a loom of the class represented in United States Patent No. 141,768, wherein horizontally-sliding notched jacks are operated by horizontally-reciprocating lifters and depressors. The crank $r$ of the shedding-shaft $q$ is connected, by a link, $a^9$, with a rod, $b^9$, attached to a bell-crank lever, $c^9$, connected, by a link, $d^9$, with a two-armed lever on a rock-shaft, each arm being connected at each end of the rock-shaft, through links, with the ends of the lifters and depressors, suitably guided to be moved in a horizontal path, the lifter and depressor being one above and the other below the notched jacks, the latter resting on the pattern-surface, and the pattern-surface being moved by shaft $a^1$, as before described.

The shedding-shaft $q$ is a short shaft parallel with the crank-shaft, and provided with a pinion, $e^9$, having peripherical and face teeth 11 12, the latter engaging a bevel-pinion, $z$, on the lower end of shaft $a^1$, connected with and operating the pattern cylinder or surface, as usual. The peripherical teeth 11 are engaged by the teeth of the crank-shaft pinion $f^9$, loose on the crank-shaft $b$, and provided with a notched hub, to be engaged by a hub, $g^9$, carried by, but free to be moved longitudinally on, the crank-shaft.

The finder-shaft $o^1$ extends across the loom, and is operated as in the looms described in Figs. 1, 2, 3, 8, 9, and 28. This finder-shaft has a friction-hub, $m^4$, connected with it by a feather, and adapted to slide thereon; and on the finder-shaft is also a toothed and friction-faced gear, $n^4$, its teeth $r^8$ being engaged with the teeth of the crank-shaft pinion $f^9$, the friction-face of hub $m^4$ being adapted to be engaged, as desired, with the friction-face $n^4$.

Each hub $m^4$ $g^9$ is embraced by a fork at the opposite ends of a shipper-lever, $h^9$, pivoted between its ends to a rock-shaft, like the one shown in Figs. 28 and 29, and operated by like devices. When the loom operates in regular order, the shedding-shaft is operated from the crank-shaft $b$, the crank-shaft pinion $f^9$ being in engagement with hub $g^9$, the friction-face of hub $m^4$ and the friction-face of hub $n^4$ being disengaged. In this modification, to find a true shed stop the loom or the crank-shaft, and the belt, moved on the loose pulley and operating in the usual way, will turn the finder-shaft $o^1$, and, by moving the shipper to bring faces $m^4$ $n^4$ in contact and releasing the crank-shaft pinion $f^9$, the finder-shaft will then operate the pinion $r^8$ positively, and it, in engagement with the pinion $f^9$, then loose on the crank-shaft $b$, moves such pinion, and it, in turn, operates pinion $e^9$ on the shedding-shaft $q$.

Figs. 42 to 45 show another way of operating the shedding mechanism and pattern-surfaces in the same class of looms just above described. The shedding-shaft $q$ is arranged at the end of the crank-shaft $b$, and the crank $r$ is connected with the elbow-lever of the lifter and depressor, as shown and described in Fig. 41. The pinion $i^9$ is secured positively to the shedding-shaft. It has bevel-teeth $j^9$ to engage and move the pinion $z$, connected, as usual, with the shaft $a^1$, for operating the pattern mechanism and peripherical teeth $k^9$, adapted to be engaged by the teeth of a pinion, $l^9$, placed loosely on the finder-shaft extending across the loom, and operated as hereinbefore described. The pinion $i^9$ has a notched hub to be engaged by a notched hub, $m^9$, on the end of the crank-shaft $b$, the hub $m^9$ being free to slide on the end of the crank-shaft under the action of the shipper $n^9$, and to rotate with crank-shaft. The end of the crank-shaft terminates in the pinion. When the hub $m^9$ and the hub of the pinion $i^9$ are engaged and the crank-shaft operates regularly, (the pinion $l^9$ on the finder-shaft being loose,) then the crank-shaft operates the shedding-shaft, as usual. The shipping mechanism is constructed to engage the hub $m^9$, and also the hub $w^9$ on the end of the finder-shaft $o^1$; and when the hub $m^9$ is disengaged and the crank-shaft is at rest, then the hub $w^9$ and the pinion $l^9$ on the finder-shaft are engaged, and the finder-shaft is positively operated, as before described, the pinion $l^9$ engaging the pinion $i^9$, then disconnected from the crank-shaft, and moving the shedding-shaft and pattern-surfaces.

Fig. 43 shows, in section, the mechanism for engaging and disengaging the pinion $l^9$ with the hub $w^9$, the latter adapted to slide longitudinally on the finder-shaft $o^1$. Attached to hub $w^9$ is a wedge, $o^9$, preferably adjustably mounted and adapted to fit between the parts $p^9$ of an expansible friction-clutch, $q^9$, (see Figs. 43 and 45,) keyed to the finder-shaft, and resting within a hollow portion of the pinion $l^9$; and when the hub is moved to insert the wedge the expansible friction-clutch is enlarged and made to grasp the pinion $l^9$. The shipper $n^9$ has a connected rod, $r^9$, with a fork, $t^9$, to engage and move hub $w^9$.

Figs. 46, 47, and 48 show yet another modification, wherein the first-motion or fast and loose pulley shaft $c$ is placed at the end of the loom-frame, and parallel to the crank and finder shafts $b$ $o^1$. The pinion $s^9$ is secured to the loose pulley $e$, and when the belt is on the loose pulley $e$ the pinion $s^9$ engages the pinion $u^1$ on the finder-shaft and moves it. The pinion $u^9$ on shaft $c$ engages pinion $h$, and pinion $h$ engages pinion $j$ on the crank-shaft, as in the other drawings. At the other end of the loom the finder and crank shafts in Fig. 46 are provided with pinions, clutches, &c., as shown in Fig. 28, to move the shedding-shaft. Fig. 48 shows the loose pulley, Fig. 46, in section.

It will be noticed that the parts $m^4$ $n^4$ of the friction-disks are provided with air-holes, to enable the disks to be disengaged easily by longitudinal motion of one away from the other, and in Fig. 50 is shown a stop, $v^9$, to serve as a bearing for the back of the disk $n^4$ when pressed against by the disk $m^4$.

The devices for operating the drop-shuttle boxes are shown on Sheets 6, 7, 8, 11, 12, 13, 16, 17, 19, 20, and 21, and on such sheets like letters are used to denote like parts as far as possible.

The radius-bar $a^6$, the double pawls $y^3$, for actuating the shuttle-box ratchets or cams, the connection $x^3$, between the pawls and fingers $e^2$ of the shuttle-box pattern-surface, the shaft $i$, the tappet or tappets $b^6$ on such shaft to move $a^6$, the drop-shuttle boxes $c^6$, with two or more cells, the shuttle-box rod $d^6$, the stirrup $e^6$, and rod-spring $f^6$, and the shaft $g^6$, for the shuttle-box ratchets or cams, are all of usual construction, and such parts are shown and described in other patents heretofore granted to me, to which reference may be had.

Fig. 33 is a detail of the shaft $g^6$, and its shuttle-box ratchets or cams, and the shaft $h^6$, with its shuttle-box-actuating levers $i^6 j^6 k^6 l^6$, the view being taken from the rear side of the loom, all other parts being removed. Fig. 18 is a modification of the same, and Figs. 21, 22, and 23 represent a modification of the cams and ratchets.

Figs. 19 and 34 represent the shuttle-box ratchets or cams on shaft $g^6$, Figs. 18 and 23, in vertical section.

Figs. 14 and 20 represent side views and sections of shuttle-box-moving devices at that end of the loom at which the shuttle-box ratchets or cams derive motion, and Fig. 17 represents the shuttle-box-moving devices at the opposite end of the loom.

Figure 1:
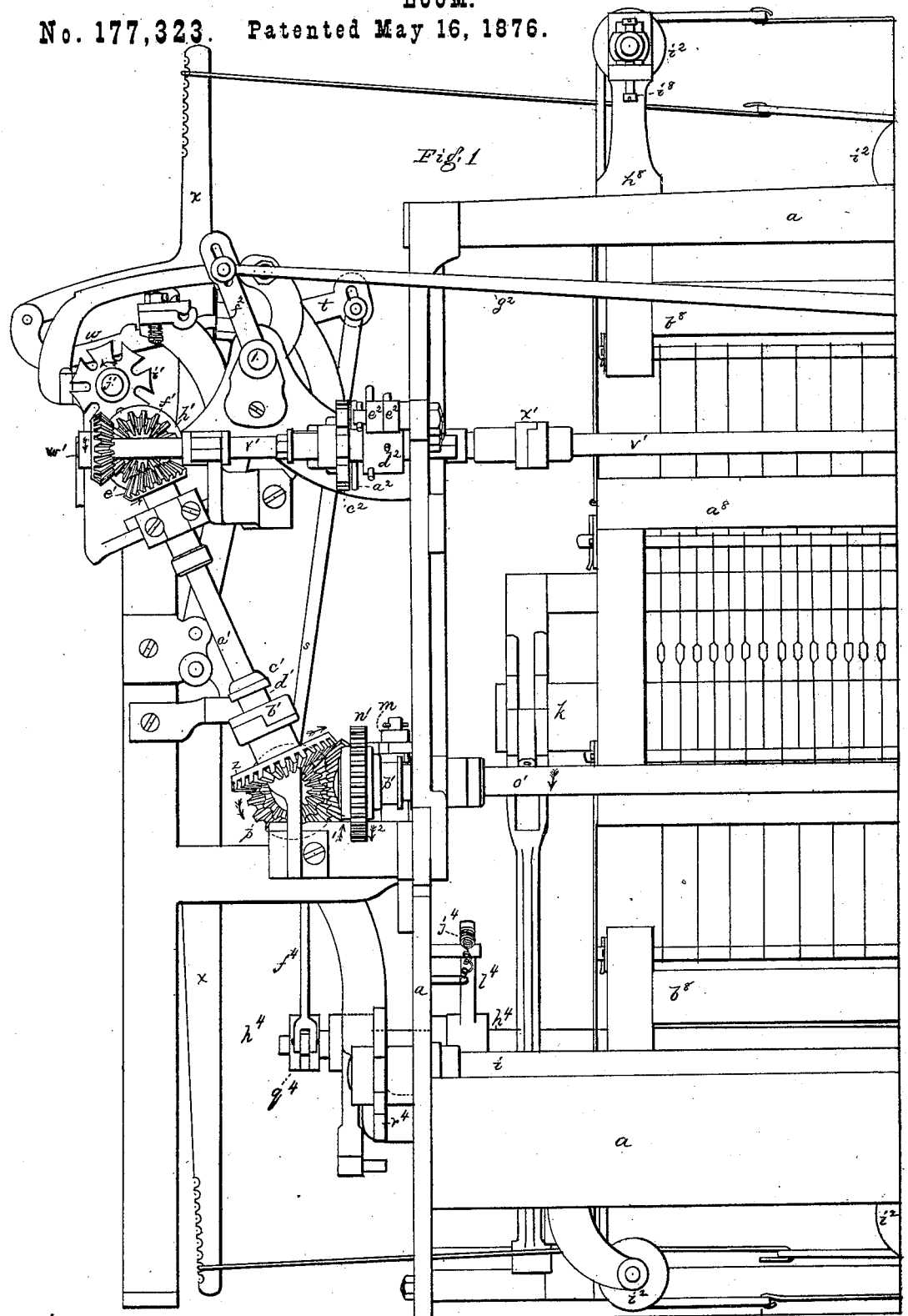
Figure 6:
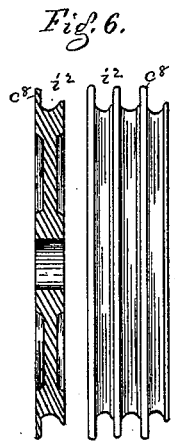
Figure 5:
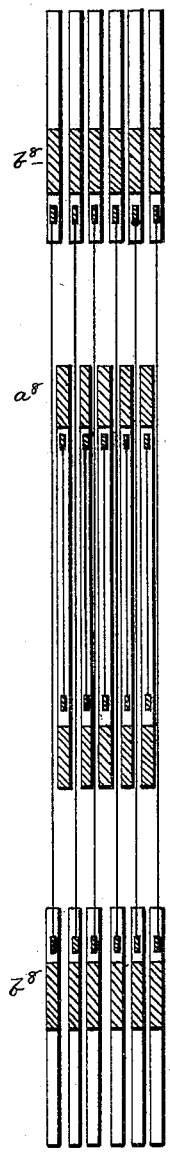
Figure 4:
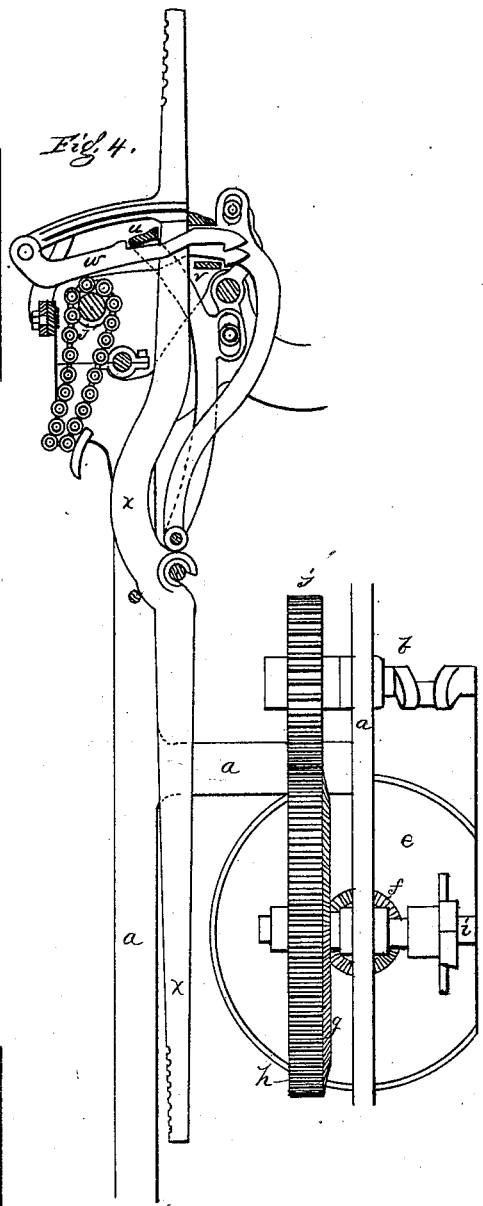
Figure 12:
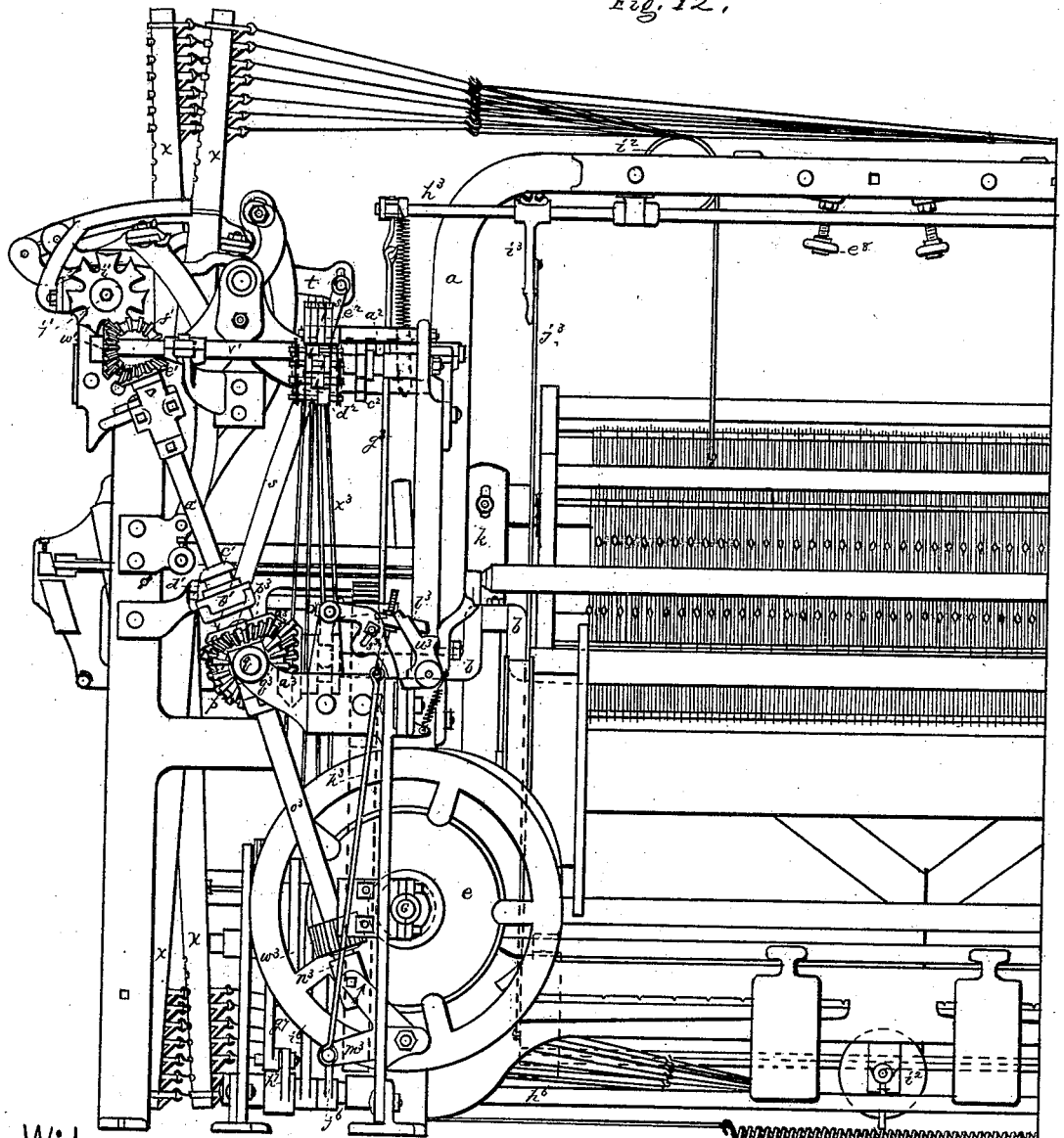

Reference is now made to Figs. 14, 17, and 20 to 24. On the shaft $g^6$, supported in bearings on the loom-frame, and also, preferably, in bearings $m^6$ outside the frame, are placed the shuttle-box ratchets or cams $n^6$ $o^6$ $p^6$ $q^6$, the devices $o^6$ $p^6$ being alike, except that the cam projection on $o^6$ (see Figs. 20 and 22) is shorter than a like-shaped cam projection on $p^6$. The ratchet $n^6$ has two teeth, 6 7, and it is keyed to the shaft $g^6$, and when $n^6$ is turned in either direction by its pawl, made like $y^3$, then the shaft $g^6$ is also turned, moving the cam $r^6$, secured at its opposite end, (see Figs. 17 and 19,) that acts upon a roller on the box-actuating lever $l^6$, having its fulcrum on shaft $h^6$, and connected by rod, cord, or chain $t^6$ with the stirrup $e^6$ of the shuttle-box rod, the chain passing over a roller or sheave, $b^7$, on the auxiliary lever $u^6$, Fig. 17, pivoted at that end of the loom, the auxiliary lever $v^6$ at the opposite end of the loom being like it, and the movement of ratchet $n^6$ and cam $r^6$ will raise or lower the shuttle-boxes shown in Fig. 17 two cells.

In Fig. 17 the cam $r^6$ is represented as having acted, and its movement to the position shown lifted the shuttle-boxes two cells; but in such Fig. 17 it will be noticed that box-lever $k^6$ has also been moved by its cam $e^7$, and, through its connection $f^7$, passing over a stationary sheave, $a^7$, on the loom-frame, has lifted the outer end of lever $u^6$, and lifted the box-rod one cell, the two levers $l^6$ $k^6$ together lifting three cells. Now, if cam $e^7$ is moved to allow the lower end of box-lever $k^6$ to move toward shaft $h^6$, the end of auxiliary lever $u^6$ will be lowered to drop the boxes one cell. If cam $r^6$ is moved to allow the upper end of box-lever $l^6$ to move toward the lay, the box-rod will be lowered to drop the boxes two cells, and if both are moved together, the boxes will be lowered three cells, or to the position shown in Fig. 20, which is a view of the shuttle-boxes at the opposite end of the loom.

Next the ratchet $n^6$ is ratchet $o^6$, with attached cam projection. (See Fig. 22, side view and section.) It is placed loosely on shaft $g^6$, has two ratchet-teeth, 6 7, a hub, $w^6$, and the hub is grooved at its periphery to receive an adjustable friction device or ring, $x^6$, provided preferably with packing leather or equivalent $y^6$. (See side view and section, Fig. 21.) This ratchet-cam $o^6$ is moved by a pawl, $y^3$, under control of the pattern-surface, as usual, and when moved in either direction, and when moved it strikes a roll on shuttle-box lever $j^6$, having its fulcrum preferably on shaft $h^6$, and joined by connection $z^6$ with the outer end of the auxiliary lever $v^6$ at the main end of the loom, (see Figs. 14, 18, and 20,) such chain $z^6$ passing over a roller or sheave, $a^7$, in this instance on a stationary stud attached to the loom-frame; but it is expressly understood that the sheave or sheaves $a^7$ might be caused to change position under the control of suitable levers and cams moved by a pattern-surface, to increase the capacity of the loom for many boxes.

The movement of ratchet $o^6$, or cam-ratchet, through its connections, as described, the parts being as shown in Fig. 20, with the upper shuttle-box cell of the series in line with the race-board, will elevate the end of auxiliary lever $v^6$, causing the roller $b^7$ to lift the chain or rod $c^7$, connected with the stirrup $e^6$ of the box-rod, (or to the box-rod in any well-known way,) the other end of the connection $c^7$ being fastened to the box-lever $i^6$, held stationary by its ratchet-cam $p^6$, and will raise the box-rod far enough to move the shuttle-boxes from one to the next adjacent cell. If the cam end of $o^6$ was resting against the roller or pin of the box-lever $j^6$, and the end of auxiliary lever $v^6$ was lifted, then the cam $o^6$, if moved in the opposite direction from that above described, by reason of the lower member of a pawl, $y^3$, acting against a tooth, 7, would release the box-lever $j^6$, and would lower the boxes one cell. Cam $p^6$ is placed loosely on shaft $g^6$. It is constructed as cam $o^6$, except that its cam is longer; but this is not absolutely necessary, for the box-levers might be placed on different fulcra to give them more or less length, and it acts on the box-lever $i^6$, or a pin or roller, $e^7$, thereon, and through connection $c^7$, passing over sheaves $b^7$, on auxiliary lever $v^6$, and connected with the shuttle-box rod; and if moved to carry the upper end of box-lever $i^6$ away from shaft $g^6$, it will, through its connections, elevate the boxes two cells, and if in such a position as to retain the lever $i^6$ away from the shaft $g^6$, then the reversal or change of the position of the cam-ratchet $p^6$ will release the lever $i^6$ and lower the boxes two cells. The ratchet $q^6$ at the end of shaft $g^6$ (see Figs. 20 and 24) is loose on shaft $g^6$, and is constructed as parts $o^6$ $p^6$, except that the cam projection is omitted, and instead thereof a slotted projection, 8, is provided, to which is adjustably attached a link, $g^7$, connected with an arm, $h^7$, on shaft $h^6$, extended across the loom, and provided (see Fig. 17)

with a cam, $e^7$, fixed thereto, and adapted to strike and move a box-lever, $k^6$, pivoted, as shown in this instance, on the shaft $g^6$, and joined by connection $f^7$ with the end of auxiliary lever $u^6$, the connection $f^7$ passing over sheave $a^7$ on a stud connected with the loom-frame, (or such sheave may be moved as before described;) and when the ratchet $q^6$ is moved in the direction of its arrow, Fig. 24, by pawl $y^3$, the cam $e^7$ will be moved to the position shown in Fig. 17, and will actuate box-lever $k^6$, to lift the auxiliary lever $u^6$, and raise the boxes one cell, and if the parts are in position shown in Fig. 17, and the ratchet $q^6$ is moved in the direction opposite its arrow, then the lever $u^6$ will be lowered, dropping the boxes one cell.

It will be readily seen that by these devices any one of a series of four boxes may be reached at will by one single movement, for one cam will move one cell in either direction, another two cells, the two in unison, and together will move three cells, and the two together in opposition will move one cell.

The friction device $x^6$ is a two-part ring, with ratchet-teeth $j^7$, and connected together by screws or equivalents, to hold the device sufficiently close against the hub $w^6$ of each ratchet-cam to prevent such ratchet-cams from moving under the pressure of the box-levers against them during the time the pawls $y^3$ are being shifted. The teeth $j^7$ of such friction device $x^6$ are adapted to be engaged and held against movement, in this instance in the direction of the arrow, Fig. 21, by a pawl, $k^7$.

Figure 13:
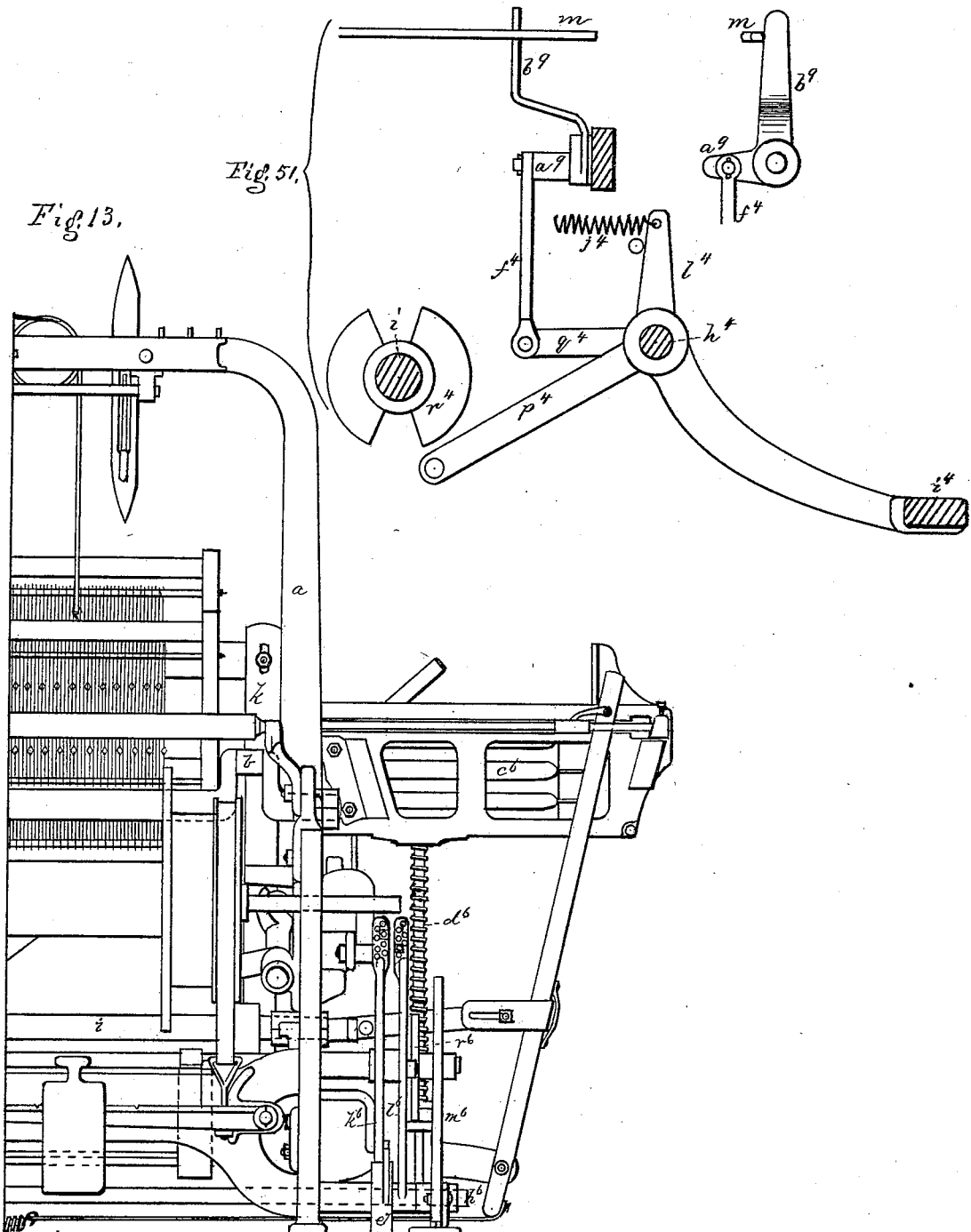
Figure 14:
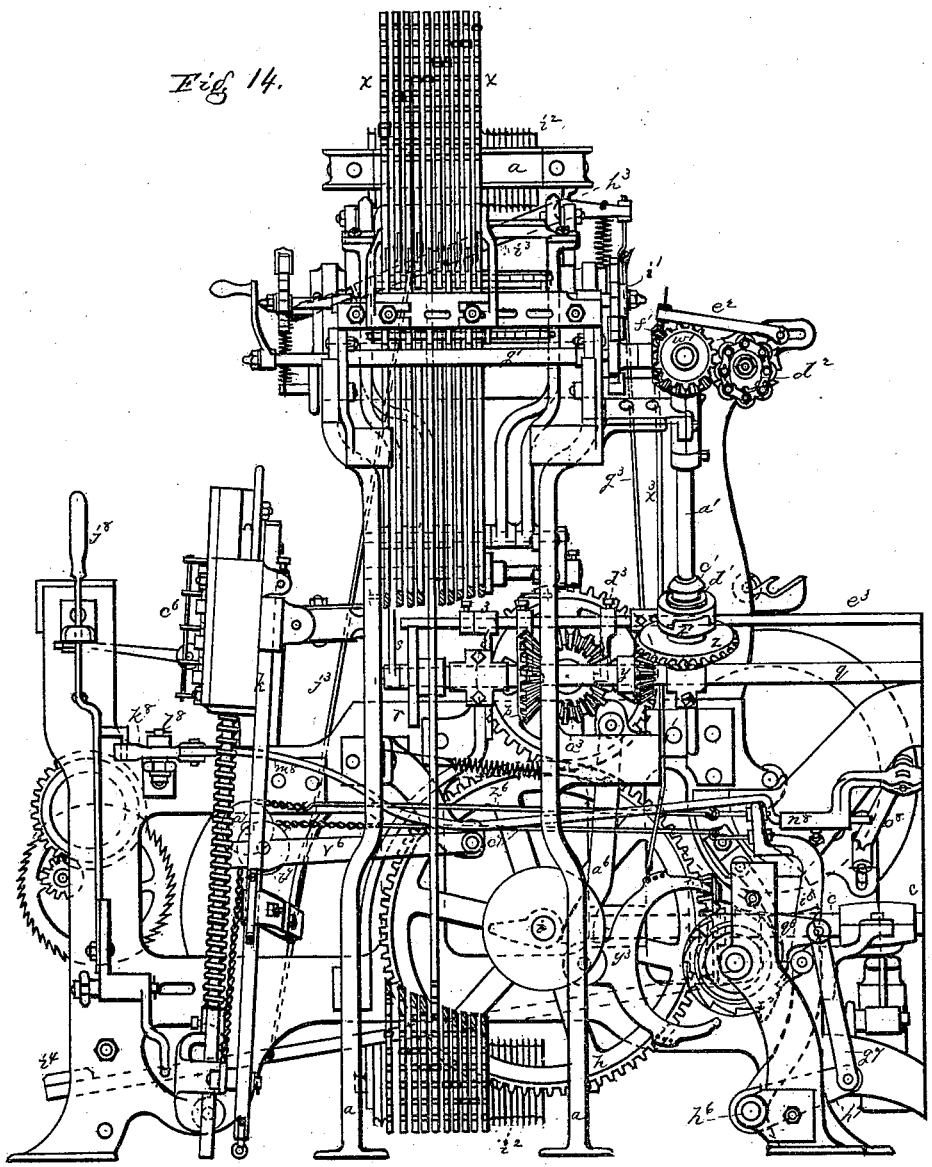
Figure 15:
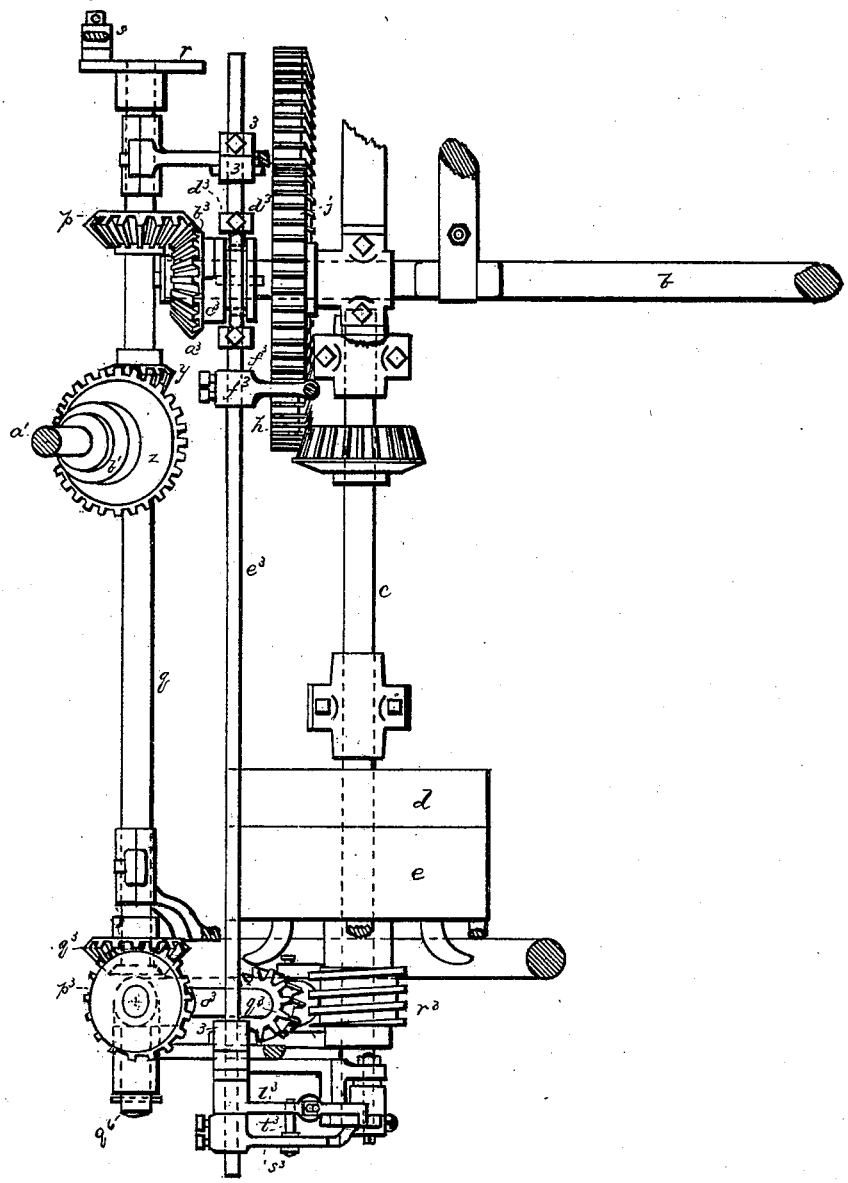
Figure 16:
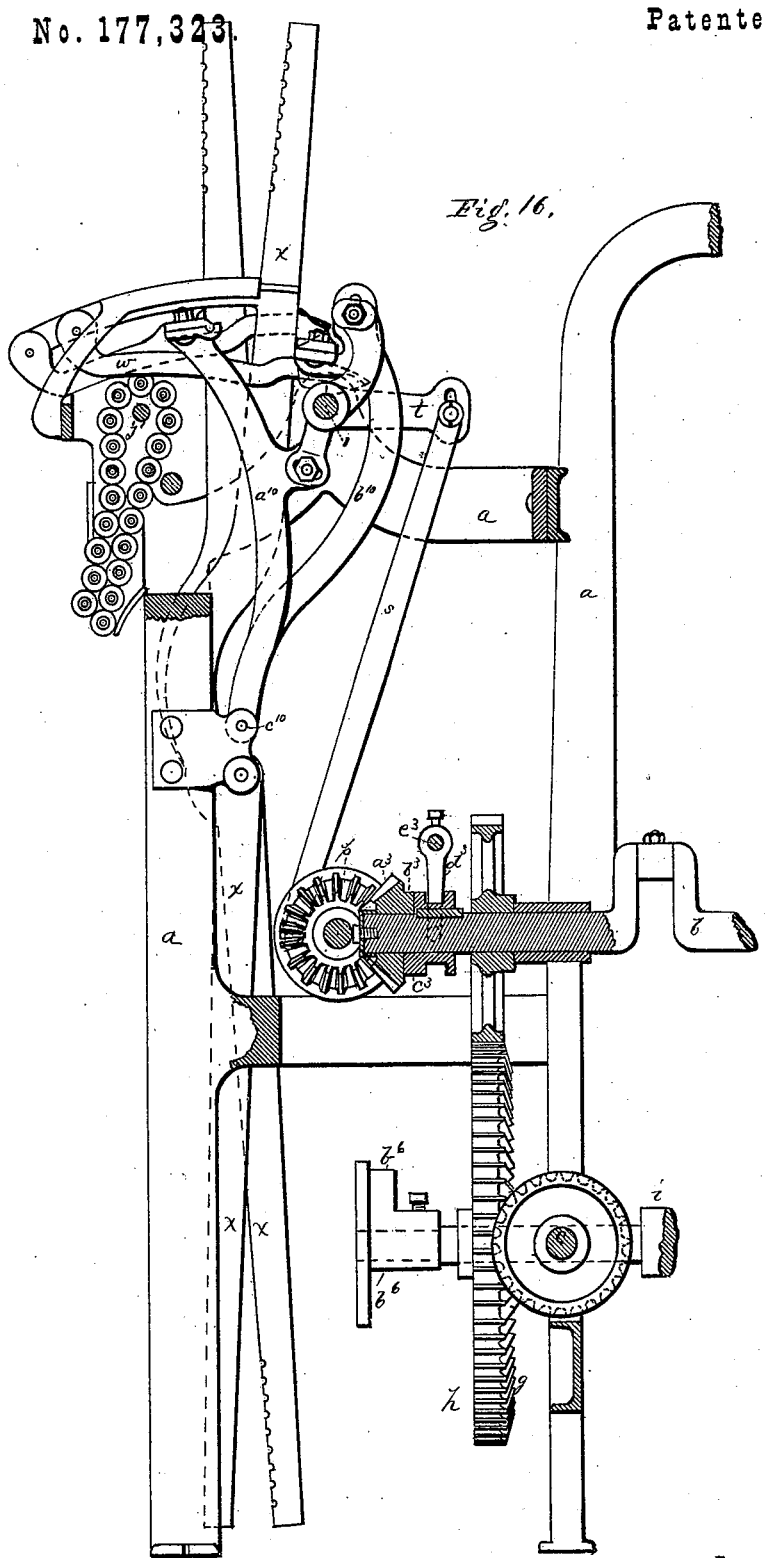
Figure 26:
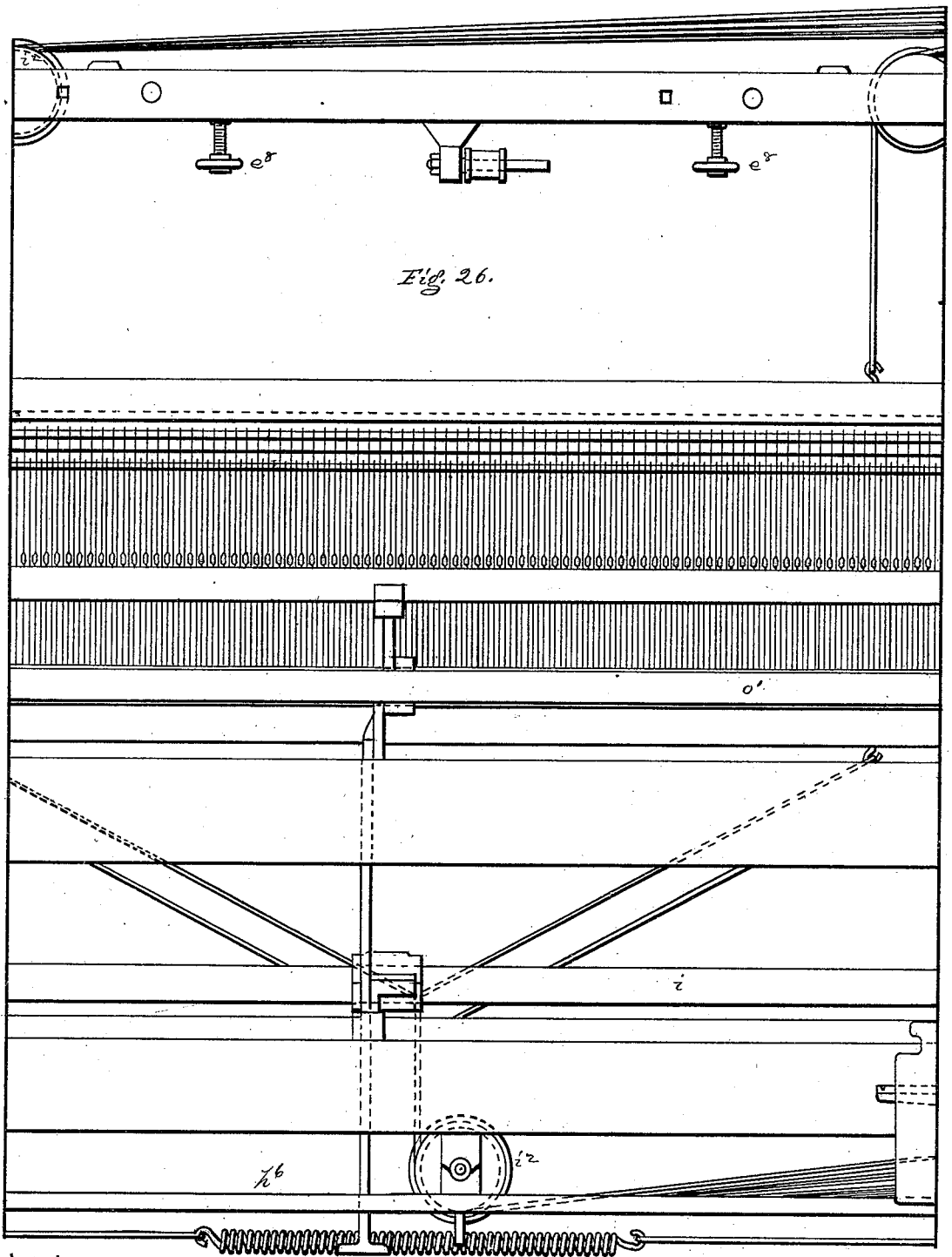
Figure 27:
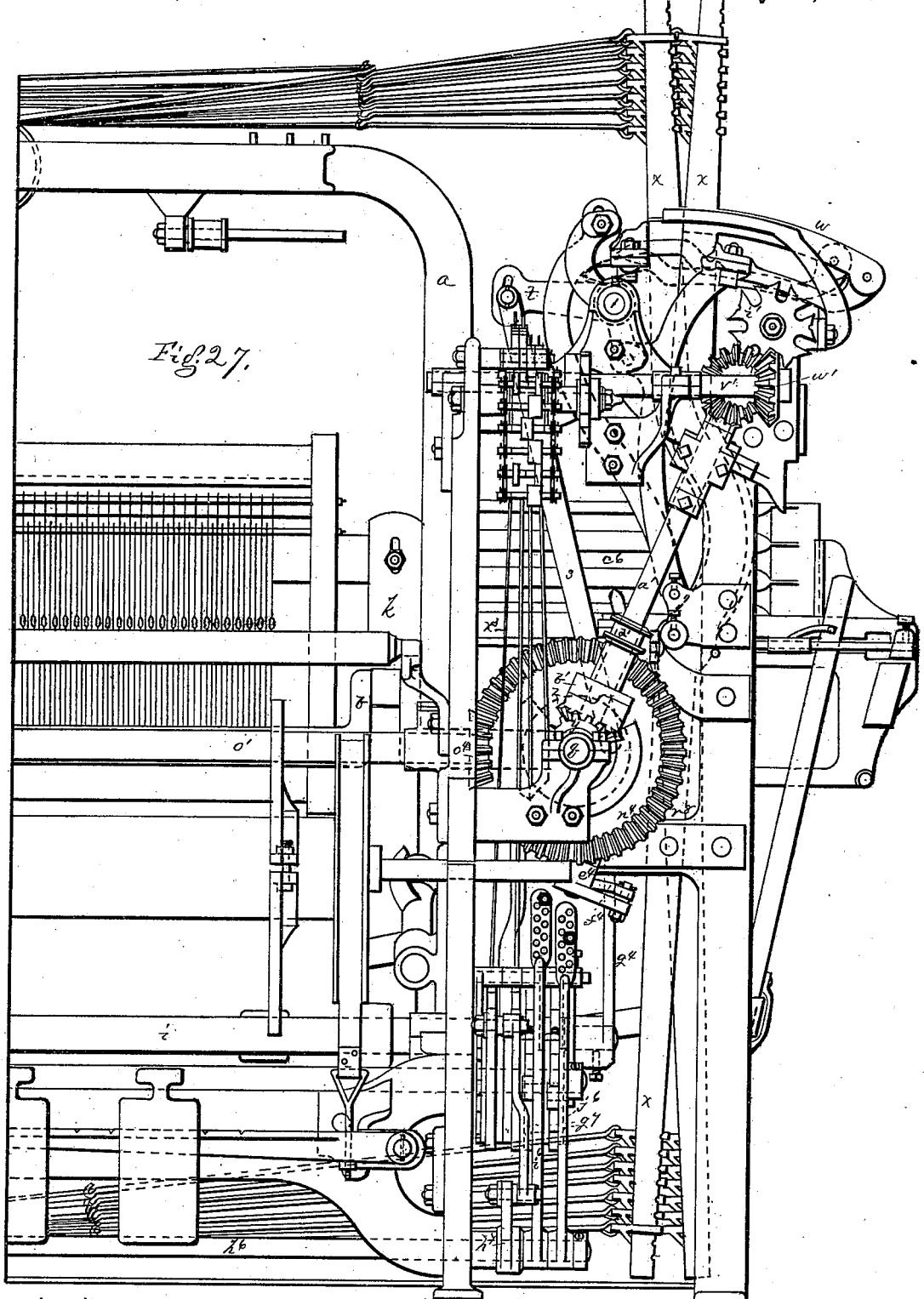

Sheets 19, 20, and 21 show a second and preferred form of shuttle-box-actuating devices, and in the figures on such sheets, having in mind the shuttle-box mechanism already described, it will be noticed (see Figs. 31, 32, and 33) that the position of the shuttle-box levers $i^6$ $j^6$ $k^6$ $l^6$ is changed. In Fig. 33, looking at the rear side of the loom, the box-lever $j^6$ is at the extreme right; then the lever $i^6$; then levers $k^6$ and $l^6$ are shown at the left of the loom. Each of these levers is, however, constructed as described in the other drawings, and is similarly joined to the auxiliary levers and shuttle-box rods, and with similar operation. In this instance, however, the main part of the shuttle-box mechanism is at the opposite end of the loom from that represented in Figs. 13, 14, and 20, and the ratchets and cams and friction devices are somewhat modified, and, therefore, it is considered necessary in Figs. 31 to 38 to describe only the parts differing slightly, but not essentially, from the construction shown in Figs. 12, 13, 14, and 20.

Figure 31:
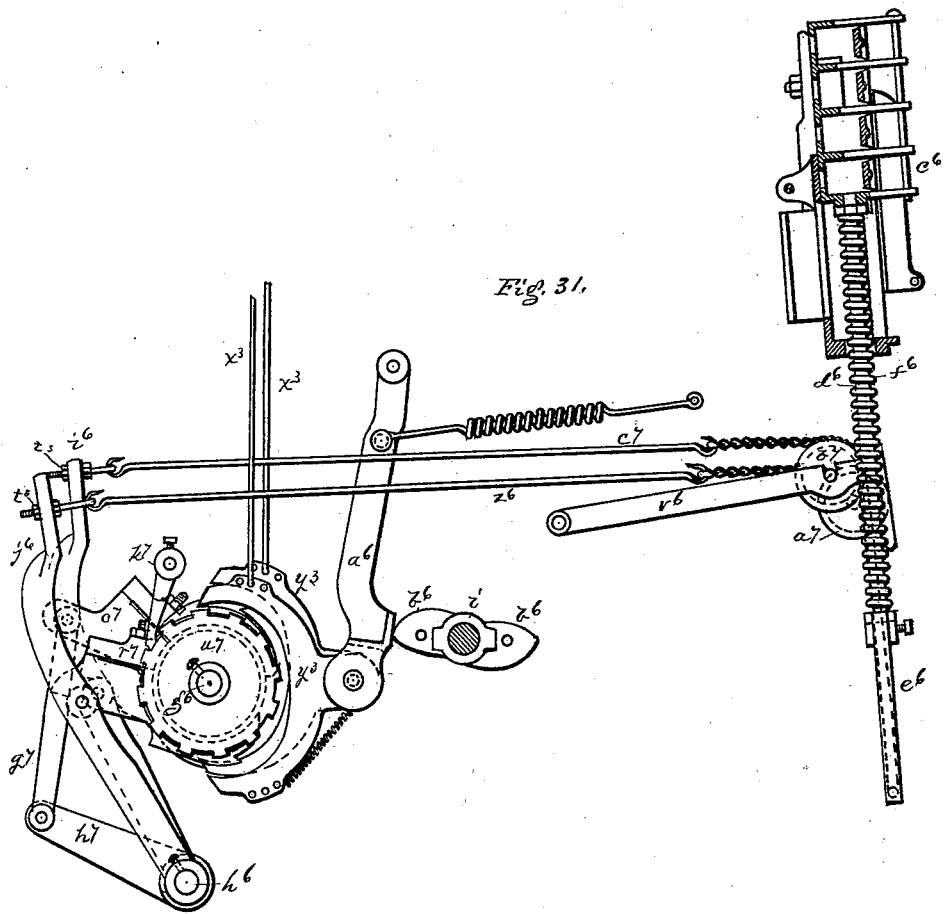
Figure 35:
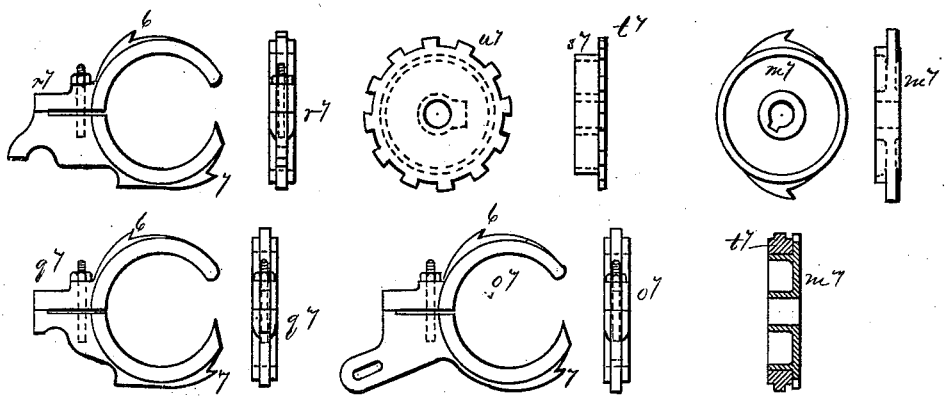
Figure 42:
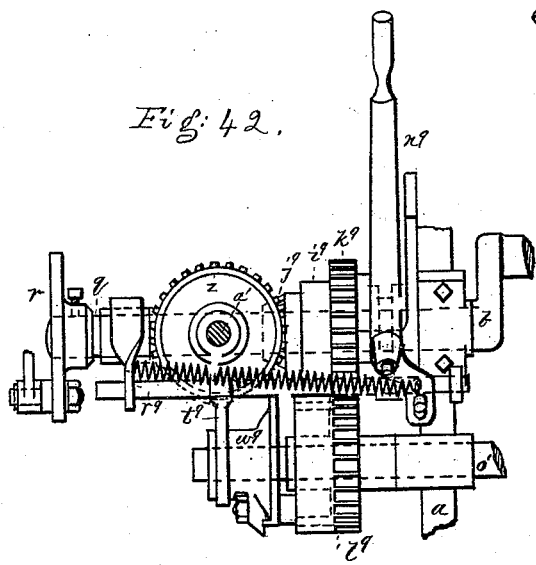
Figure 44:
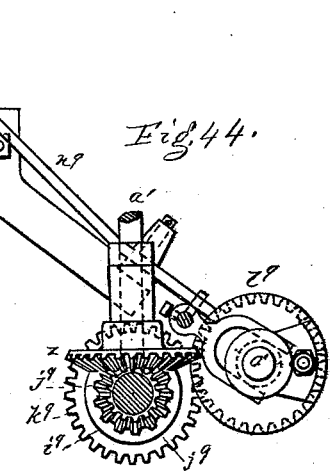
Figure 43:
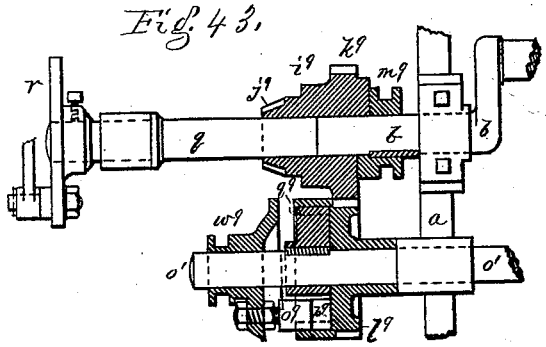
Figure 45:
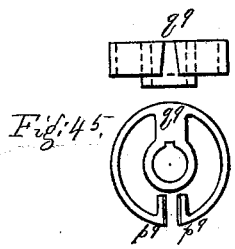

In Fig. 20 the ratchet $q^6$, connected by link $g^7$ with arm $h^7$ of shaft $h^6$, provided with a cam to move box-lever, $k^6$, was situated at the extreme left of the loom, viewing it from the rear side; but in Figs. 31 and 33 the corresponding parts are placed near the loom-frame at the opposite end of the loom. The ratchet $m^7$ corresponds with ratchet $n^6$, and it is fixed to shaft $g^6$ to move such shaft positively, and cause cam or arm $n^7$, Figs. 32 and 34, (corresponding with cam $r^6$, Figs. 17, 18, and 19, except that in this instance it is not fixed to shaft $g^6$,) to move box-lever $l^6$, pivoted to shaft $h^6$. Ratchet $o^7$ corresponds with ratchet $q^6$, Figs. 18 and 24, and it is connected by a link, $g^7$, with shaft $h^6$, as before described, to move the shaft and its cam $p^7$, corresponding with cam $e^7$, Figs. 17 and 18, to move a box-lever, $k^6$. Ratchet-cams $q^7$ $r^7$ correspond with similar cams $o^6$ $p^6$, Figs. 17 and 18, and they move box-levers $j^6$ $i^6$.

The devices $o^7$ $q^7$ $r^7$ are made in two parts instead of one, as in Figs. 22 and 24, and are held together by an adjusting-screw, the two parts of each ratchet firmly grasping a hub, $s^7$, on a friction device, $t^7$, provided with teeth $u^7$, adapted to be held by a pawl or detent, $k^7$, Fig. 31, to prevent motion of $o^7$ $q^7$ $r^7$ when not actuated positively by the pawls $y^3$, as selected by the shuttle-box pattern-surface.

The cam $n^7$, Figs. 32 and 36, instead of being secured to shaft $g^6$ by a key, as cam $r^6$ in Figs. 17 and 19, is placed about its friction-hub $t^7$, and has teeth 6 7, that are caught by a double or forked arm, $v^7$, Fig. 37, attached to shaft $g^6$ by screws $w^7$, the ratchet-cam $n^7$ being moved positively in both directions.

The connections between the box-levers and box-rods and their connections $z^6$ $c^7$ are, in this instance, made by screw-hooks $t^8$, adjustable longitudinally, and also adjustable toward the ends of the box-levers, to compensate for wear and to facilitate adjustments, the holes $u^8$ in the ends of the box-levers allowing the position of hooks $t^8$ to be changed to or from the ends of the levers. The finder-shaft may be connected with, and operated from, the first-motion shaft by gearing rather than by belt.

I am aware that it is not new to disconnect the shaft that operates the shedding mechanism and its pattern-surface from the crank-shaft, and then to turn the shedding-shaft backward or independently by means of a handle connected with it, the movement of this shaft (it being connected by gearing, and crank and link with the shedding mechanism and its pattern-surface) forming sheds while the crank-shaft remains at rest, for such mechanism is found in an application of Horace Wyman, now on file in the United States Patent Office.

The English Patent No. 632, for the year 1870, has on the crank-shaft at each end of the loom a clutching-hub, and when the loom is in regular operation said hubs are operated from the fast pulley on the crank-shaft, and such patent partially describes how, through a cross-shaft provided at each end with a toothed wheel fast to the shaft, and engaging the tooth-hubs, a mechanism described may move the shuttle-boxes at one end of the loom, and a shaft at the other end of the loom, adapted to move shedding devices; but in such a loom the cross-shaft cannot be driven backward, except by hand, and it is not apparent from the drawing or description that the shed-forming devices could be made to form sheds when the parts are operated by hand from the hand-crank.

These true-shed-finding devices might be applied to looms wherein the harness-levers are made angular instead of being long and straight, and placed at or near the top of the loom, the notched jacks being connected therewith and operated, as usual, by a pattern-surface.

While the true shed is being found, through the action of the finder and shedding shafts, the crank-shaft and shaft $i$ are at rest; but when the shed is found, then the belt is thrown from the loose to the fast pulley $d$. This operation stops the movement of the finder-shaft, and starts the crank-shaft and shaft $i$, and the cam $r^4$, being freed from engagement with the arm $p^4$, permits the spring $j^4$ to automatically throw into engagement the clutch for engaging the crank and shedding shafts, in order that all the parts may operate correctly and in unison, to weave in the regular manner.

I claim—

1. The shedding-shaft and connecting devices to operate the shed-forming mechanism and its pattern-surface, as described, and adapted to be connected with or be disconnected from the control of the crank-shaft, in combination with a finder-shaft and a loose pulley to operate it, whereby the shedding-shaft in engagement with the shedding mechanism may be operated through the finder-shaft, to form sheds and move the pattern-surface backward or forward while the crank-shaft is at rest, substantially as set forth.

2. A shedding-shaft and connecting devices adapted to operate the shed-forming devices and the pattern-surface of the shedding devices, substantially as described, in combination with a crank-shaft, a clutch to connect or disconnect the shedding and crank shafts, a finder-shaft, a first-motion shaft, and fast and loose pulleys, and a clutch or equivalent coupling mechanism, to connect and disconnect the finder and shedding shafts, substantially as described, whereby a driving-belt on the fast pulley, during the engagement of the crank-shaft with the shedding-shaft, will actuate the shedding devices and the pattern-surface therefor, and, during the time the belt is on the loose pulley and the crank-shaft at rest, the finder-shaft driven from the loose pulley will operate the shedding-shaft to find a true shed, substantially as described.

3. The shedding-shaft connected with and adapted to operate shed-forming devices, a pattern-surface for the shedding devices, and a pattern-surface for the shuttle-box mechanism, both pattern-surfaces being located at the same end of the loom, in combination with a crank-shaft and a finder-shaft, and with clutches adapted to connect the crank and shedding or finder and shedding shafts at will, while either the finder or crank shaft is at rest, substantially as described, whereby the shedding-shaft and its connected shed-forming mechanism and pattern-surface, and pattern-surface for the shuttle-boxes, as above described, may be operated from either the crank-shaft or the finder-shaft, substantially as described.

4. The finder-shaft $o^1$, extended across the loom-frame parallel with the crank-shaft, and actuated by the loose pulley, and a clutch to engage and disengage the shedding and finder shafts, in combination with a shedding-shaft connected with the shed-forming devices, and with the pattern-surface thereof, and with a crank-shaft and device for disconnecting or connecting the shedding and crank shafts, substantially as described.

5. In combination, the finder-shaft, a loose pulley to operate it, as described, the crank-shaft, the shedding-shaft, a pinion on the crank-shaft, a pinion on the finder-shaft, and two clutches, or substantially equivalent coupling devices, and a shipper, whereby either the finder or the crank shaft may be connected with or disconnected from the shedding-shaft, to permit either the crank-shaft or the finder-shaft to be operated to move the shedding-shaft, to weave in the regular manner, or to find the true shed while the crank-shaft is at rest, substantially as described.

6. The shuttle-box rod, the connections $t^6$ $f^7$, and levers to move them, in combination with the lever $u^6$ and its sheave, and the stationary sheave $a^7$, to operate substantially as described.

7. A ratchet-cam for operating the shuttle-boxes, and a friction device, constructed substantially as described, in combination with a detent to hold the friction device when not actuated by the pawl, substantially as set forth.

8. The auxiliary lever and its sheave, arranged as described, to sustain a flexible connection which is joined to the shuttle-box rod, in combination with a flexible connection connected with the auxiliary lever, and with mechanism to move this connection to raise and lower the lever and its sheave, substantially as described.

9. Shafts $g^6$ $h^6$ and levers $k^6$ $l^6$, in combination with a cam on shaft $g^6$ to operate lever $l^6$, and with a cam on shaft $h^6$ to operate lever $k^6$, substantially as described.

10. Shuttle-box ratchet $o^7$, link $g^7$, arm $h^7$, and shaft $h^6$, in combination with the cam at the opposite end of shaft $h^6$, and with a shuttle-box lever and connection to raise or lower the auxiliary lever, substantially as described.

11. The two-part shuttle-box ratchet-cam and connecting and adjusting screw and friction device, in combination with a double pawl to move the cam, and a detent to hold the friction device, substantially as described.

12. The finder-shaft and a loose pinion adapted to be operated by it when the crank-shaft is at rest, and the shedding and crank-shaft, and a clutch to connect or disconnect them, in combination with a shipper adapted to operate the clutches, or equivalent connections between the shedding, crank, and finder shafts, whereby movement of the shipper to engage the shedding and crank shafts will disconnect the shedding and finder shafts, and movement to engage the shedding and finder shafts will disengage the shedding and crank shafts, substantially as described.

13. A crank-shaft, a shedding-shaft, and a finder-shaft, and clutches or equivalent connections, to connect or disconnect either the shedding or crank shafts, or shedding and finder shafts, and a shipper to move the clutches or equivalent connection, in combination with a foot-treadle and connecting mechanism, whereby the foot-treadle is adapted to move the shipper to engage the shedding-shaft with, or to disengage it from, either the crank or finder shafts, substantially as described.

14. The rock-shaft, the treadle, a spring to move the treadle in opposition to the action or movement of the foot, in combination with a clutch, and the shedding and crank shafts, and a shipper and connections between the treadle and the shipper, to automatically operate the clutch, to engage the shedding and crank shafts when the belt is moved onto the fast pulley, substantially as described.

In testimony whereof I have signed my name to this specification in the presence of two subscribing witnesses.

GEO. CROMPTON.

Witnesses:
 JOHN BROOKS,
 J. A. WARE.